United States Patent
Adachi et al.

(10) Patent No.: US 8,882,324 B2
(45) Date of Patent: Nov. 11, 2014

(54) LIGHTING DEVICE, DISPLAY DEVICE AND LIQUID CRYSTAL DISPLAY DEVICE

(75) Inventors: Masaya Adachi, Hitachi (JP); Akiyoshi Tobe, Oamishirasato (JP); Yasuhisa Shiraishi, Mobara (JP)

(73) Assignee: Japan Display Inc., Tokyo (JP)

( * ) Notice: Subject to any disclaimer, the term of this patent is extended or adjusted under 35 U.S.C. 154(b) by 133 days.

(21) Appl. No.: 13/523,287

(22) Filed: Jun. 14, 2012

(65) Prior Publication Data

US 2012/0320310 A1  Dec. 20, 2012

(30) Foreign Application Priority Data

Jun. 16, 2011  (JP) .................................. 2011-133909

(51) Int. Cl.
| G02F 1/1335 | (2006.01) |
| F21V 7/04 | (2006.01) |
| F21V 5/02 | (2006.01) |
| G02B 5/04 | (2006.01) |
| F21V 8/00 | (2006.01) |

(52) U.S. Cl.
CPC .............. G02B 5/045 (2013.01); G02B 6/0053 (2013.01); G02B 6/0056 (2013.01)
USPC ................ 362/620; 349/62; 349/57; 362/339

(58) Field of Classification Search
USPC ....................... 362/620, 337, 339; 349/57, 95
See application file for complete search history.

(56) References Cited

U.S. PATENT DOCUMENTS

| 5,851,062 A * | 12/1998 | Shinohara et al. ............. 362/620 |
| 7,179,513 B2 * | 2/2007 | Jones et al. ..................... 428/1.5 |
| 7,384,173 B2 * | 6/2008 | Whitney ........................ 362/330 |
| 7,768,710 B2 * | 8/2010 | Yang et al. ..................... 359/641 |
| 2007/0189034 A1 * | 8/2007 | Kim et al. ...................... 362/607 |
| 2008/0297699 A1 * | 12/2008 | Shimazaki et al. ............. 349/67 |
| 2009/0231859 A1 * | 9/2009 | Yeh et al. ....................... 362/339 |

(Continued)

FOREIGN PATENT DOCUMENTS

| CN | 101726909 | 6/2010 |
| CN | 101738657 | 6/2010 |
| JP | 2010-262813 | 11/2010 |
| KR | 10-2008-0002006 | 1/2008 |

OTHER PUBLICATIONS

English translation of Office Action in connection with Corresponding Chinese Patent Application No. 201210203593.2, dated Apr. 28, 2014.

*Primary Examiner* — Edward Glick
*Assistant Examiner* — Mark Teets
(74) *Attorney, Agent, or Firm* — Antonelli, Terry, Stout & Kraus, LLP.

(57) ABSTRACT

A lighting device includes a light source 30, a light guide 20 provided adjacent to the light source 30 and including a light source light incident surface 21 on which light emitted by the light source 30 enters and a planar light emission surface 22 from which planar light is emitted, and an optical sheet 50 including a planar light incident surface 53 on which the planar light enters, and configured to change a traveling direction of the planar light because a light emission side of the optical sheet 50 has a shape in which plural columnar prisms 51 extending in parallel to the light source light incident surface 21 are arranged side by side. In each of the prisms 51, a distal surface has at least different two kinds of inclination angles.

15 Claims, 16 Drawing Sheets

(56) References Cited

U.S. PATENT DOCUMENTS

| | | |
|---|---|---|
| 2010/0123854 A1* | 5/2010 | Adachi et al. .................. 349/61 |
| 2010/0157195 A1* | 6/2010 | Miyatake et al. ............... 349/62 |
| 2010/0277669 A1 | 11/2010 | Adachi et al. |
| 2013/0135899 A1* | 5/2013 | Tsai et al. ..................... 362/609 |

* cited by examiner

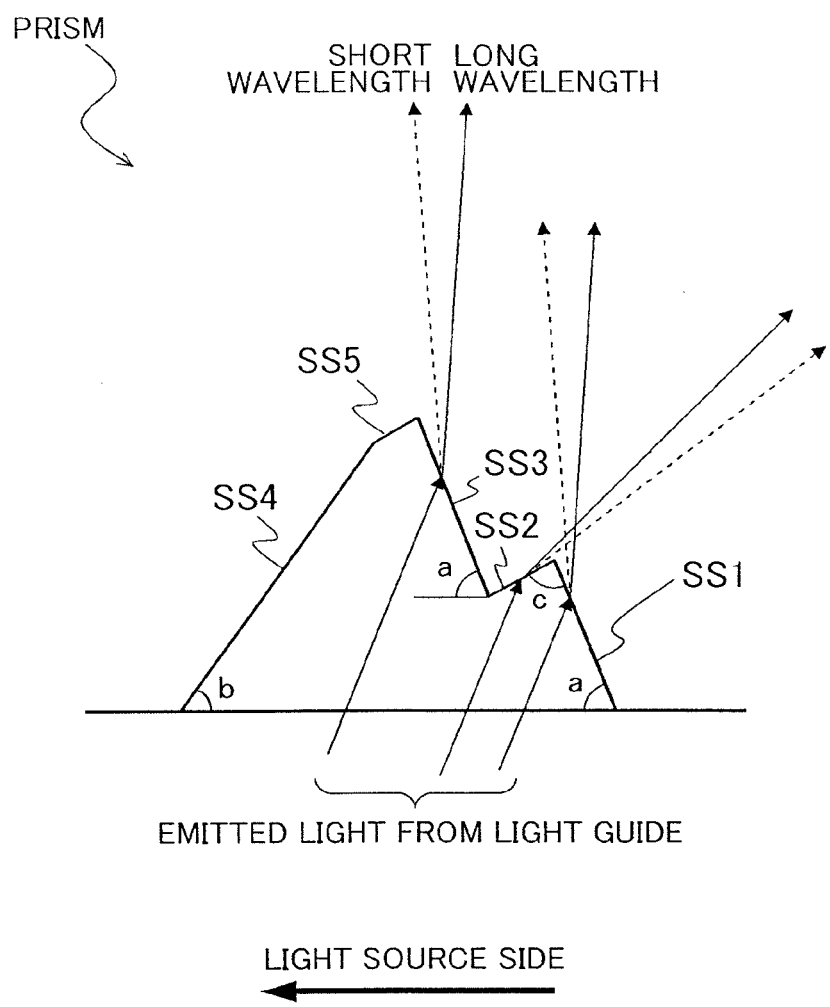

LIGHTING DEVICE, DISPLAY DEVICE AND LIQUID CRYSTAL DISPLAY DEVICE

CROSS-REFERENCE TO RELATED APPLICATION

The present application claims priority from Japanese application JP2011-133909 filed on Jun. 16, 2011, the content of which is hereby incorporated by reference into this application.

BACKGROUND OF THE INVENTION

1. Field of the Invention

The present invention relates to a lighting device and a display device and a liquid display device in which the lighting device is used and, more particularly, to a technique effectively applied to a lighting device that realizes a planar light source by using a light guide and a display device, in particular, a liquid crystal display device in which the lighting device is used as a backlight.

2. Description of the Related Art

A display device is a medium that visually transmits information to humans. In the modern advanced information society, the display device is an important entity for the humans and the society. In particular, the performance of a liquid crystal display device has been remarkably improved in recent years. The liquid crystal display device is adopted as a display device mounted on a cellular phone terminal, a display device connected to a personal computer and used, and a display device of a large-screen television and the like. In general, the liquid crystal display device includes a liquid crystal display panel and a backlight (a lighting device) in the back of the liquid crystal display panel and configured to irradiate light on the liquid crystal display panel.

The liquid crystal display device including the backlight (hereinafter simply referred to as "liquid crystal display device") adjusts, independently in respective pixels, an amount of transmission of light, which is emitted from the backlight, through the liquid crystal display panel to display a video and an image. As the liquid crystal display panel, a liquid crystal display panel that includes a pair of polarizers and a liquid crystal layer arranged between the pair of polarizers and controls a polarization state of light passing through the liquid crystal layer to perform display is desirable because a video with a high contrast ratio can be obtained at a relatively low driving voltage. As a display system of such a liquid crystal display panel, for example, a TN (Twisted Nematic) system, an STN (Super Twisted Nematic) system, an ECB (Electrical Controlled Birefringence) system, an IPS (In-Plane Switching) system, and a VA (Vertical Aligned) system are known. In all the display systems, the liquid crystal display panel usually includes a pair of substrates, a liquid crystal layer held between the substrates, and a pair of polarizers arranged across the liquid crystal layer and the pair of substrates. The liquid crystal display panel changes a polarization state of light entering the liquid crystal layer to control a transmitted light amount of the light in respective pixels and display a video and an image.

The polarizers used in the liquid crystal display panel have a function of absorbing predetermined linearly polarized light components and transmitting linearly polarized light having a vibration plane orthogonal to a vibration plane of the predetermined linearly polarized light components. Therefore, when light from the backlight (hereinafter referred to as backlight light) irradiated on the liquid crystal display panel is unpolarized light, the polarizers provided in the liquid crystal display panel absorb at least 50% of the backlight light. In other words, in the liquid crystal display device, when the backlight light is the unpolarized light, about a half of the backlight light is absorbed by the polarizers and lost. Therefore, in realizing a brighter image or a liquid crystal display device that consumes low electric power, it is important to reduce a ratio of the backlight light absorbed by the polarizers provided in the liquid crystal display panel and improve utilization efficiency of the backlight light.

As the backlight of the liquid crystal display device, for example, there are an edge light type (a light guide body type), a direct type (a reflector type), and a planar light source type. These types are properly used according to an application or the like of the liquid crystal display device. The backlight of the edge light type is easily reduced in thickness, reduced in weight, and reduced in power consumption compared with the other types and is often used in, for example, a liquid crystal display device mounted on a portable electronic apparatus. The backlight of the edge light type includes a liner or point-like light source, a light guide that spreads light from the light source in a planar shape and emits the light to the liquid crystal display panel side, optical sheets such as a prism sheet and a diffusion sheet, and a reflection sheet.

Lights emitted from the light guide in the backlight of the edge light type (hereinafter simply referred to as "backlight") generally have a maximum (a peak) of luminance or luminous intensity in a direction tilting 50 degrees to 80 degrees with respect to a perpendicular (normal) direction of an light emission surface in the light guide. Therefore, the optical sheets such as the diffusion sheet and the prism sheet are arranged between the light guide and the liquid crystal display panel to adjust a traveling direction of the lights emitted from the light guide and set a direction in which the luminance or the luminous intensity is maximized in a front direction (i.e., the perpendicular direction of the light emission surface of the light guide) or a direction near the front direction.

As a general configuration of the backlight, the reflection sheet is arranged on the rear surface side of the light guide and the diffusion sheet and two prism sheets are arranged in this order on a planar light emission surface side, which is the front surface, of the light guide. In this case, the diffusion sheet acts to diffuse the lights emitted from the light guide and expand a traveling range of the light. Further, the diffusion sheet also acts to bring a peak angle (an angle at which the luminance or the luminous intensity is maximized) of the lights emitted from the light guide close to the front direction (the perpendicular direction of the light emission surface in the light guide). On the other hand, the prism sheets are light-transmitting optical members in which plural prisms are continuously arranged on a sheet-like substrate. In general, the cross-sectional shape of the prisms is a triangular shape having a vertex angle of 90 degrees. In general, such two prism sheets are arranged such that ridgelines of the prisms of the prism sheets are orthogonal to each other.

Emitted light of such a backlight is substantially unpolarized light. Therefore, at least 50% of the light emitted from the backlight is absorbed by the polarizers provided in the liquid crystal display panel and lost. In order to suppress the absorption loss in the polarizers of the light emitted from the backlight, two methods are mainly proposed. One is a method of arranging a reflective polarizer between the backlight and the liquid crystal display panel and the other is a method of using a backlight that emits light with a high ratio of the predetermined linearly polarized light components.

The reflective polarizer acts as explained below. Among lights emitted from the backlight and traveling to the liquid crystal display panel, polarized light components to be absorbed by the polarizers and lost are reflected on the reflective polarizer before being absorbed by the polarizers. The light reflected on the reflective polarizer is reflected on the backlight as well and travels to the liquid crystal display panel as well. At this point, a polarization state of the light reflected on the backlight changes. Therefore, a part of the light traveling to the liquid crystal display panel as well passes through the reflective polarizer and the polarizers to be used for display. In other words, the absorption loss in the polarizers decreases because the liquid crystal display device includes the reflective polarizer. Therefore, the luminance of the liquid crystal display device can be increased.

On the other hand, as the backlight that emits light with a high ratio of the predetermined linearly polarized light components, for example, there is a backlight disclosed in JP 2010-262813 A. The backlight disclosed in JP 2010-262813 A makes use of the fact that, among lights emitted from the light guide, in light emitted at a tilt angle of about 60 degrees to 80 degrees with respect to the perpendicular direction of the light emission surface of the light guide, the number of p-polarized light components is larger than the number of s-polarized light components. On the light emission surface side of the light guide, a prism sheet configured to preferentially guide, to the front direction, light having a large amount of p-polarized light components emitted from the light guide is used. When the prism sheet is used, the backlight having a large light amount of the predetermined linearly polarized light components is realized by also making use of polarization dependency of transmittance on an interface between the prism sheet and the air.

SUMMARY OF THE INVENTION

The inventors of this application diligently examined a backlight having a configuration in which plural light sources including light-emitting diodes are linearly arranged on a light source light incident surface of a light guide. As a result, the inventors found that two points described below are effective to increase luminance in the front direction (a direction perpendicular to the light emission surface) of the backlight through improvement of the related art.
1. The diffusion sheet arranged on the light emission surface (the planar light emission surface) of the light guide is removed or replaced with a diffusion sheet having a low haze value.
2. As the directions of the prism ridgelines of the prism sheets, the direction of the prism sheet on the lower side is set in a direction substantially orthogonal to a longitudinal direction of an end face on which the light sources are arranged (hereinafter referred to as light source light incident surface) among end faces of the light guide and the direction of the prism sheet on the upper side is set in a direction substantially parallel to a longitudinal direction of the light source light incident surface.

However, under this condition, the inventors found that two problems explained below occur.
Problem 1: When prism sheets, the cross-sectional shape of prisms of which is an isosceles triangle having a vertical angle of 90 degrees and a base angle of 45 degrees, are used as the prism sheets, an angle at which luminance is maximized (hereinafter also referred to as peak angle) shifts about 10 degrees from the front direction.
Problem 2: In a region near the light sources, luminance unevenness depending on an arrangement position of the light sources tends to be visually recognized.

The problem 1 can be solved by changing the cross-sectional shape of the prisms at least in the prism sheet arranged on the upper side of the two prism sheets. Specifically, the peak angle can be corrected to the front direction by changing the cross-sectional shape of the prisms to a triangle having a base angle larger than 45 degrees. However, in this case, a new problem 3 occurs.
Problem 3: A color of light emitted from the backlight substantially changes according to an observing direction.

The problem 3 is caused by wavelength dispersion (wavelength dependency of a refractive index) of transparent bodies included in the prism sheets. The problem 3 occurs because a refraction angle in the prisms is different according to the wavelength of light. The problem 3 can be reduced by applying the prism sheets disclosed in JP 2010-262813 A. FIG. 19 is a schematic diagram showing an example of the cross-sectional shape of the prism used in the prism sheet in the past and is an explanatory diagram of a principle for suppressing changes in colors due to a difference of a view angle. Among lights emitted from the light guide and entering on the prism sheet as illustrated in FIG. 19, lights entering on inclined surfaces SS1 and SS3 of the prism are refracted on interfaces with the air. Then, the lights are refracted larger to the light sources side (the left side in the figure) as the wavelength of the lights is smaller. On the other hand, among the lights emitted from the light guide and entering on the prism sheet, light entering on an inclined surface SS2 of the prism is refracted on an interface with the air. Then, the light is more largely refracted to a direction (the right side in the figure) opposite to the light sources side as the wavelength of the light is smaller. In other words, in the related art, changes in colors due to the wavelength dispersion are suppressed by providing the inclined surfaces having the different refracting directions in the prism.

However, when the prism sheet including the prism having such a cross-sectional shape is used, for example, the light entering on the inclined surface SS2 is refracted in the direction different from the front direction. Therefore, the luminance in the front direction decreases. Further, in this case, another problem 4 explained below occurs.
Problem 4: When a reflective polarizer is provided between the backlight and the liquid crystal display panel, an effect of luminance increase by the reflective polarizer is low particularly in the front direction.

When the reflective polarizer is provided between the backlight and the liquid crystal display panel, among lights emitted from the backlight, light reflected on the reflective polarizer and returning to the backlight side travels to the liquid crystal display panel side again after being reflected on the backlight. Therefore, as the reflectance of the backlight, in particular, the reflectance in the front direction of the backlight is higher, the effect of luminance increase by the provision of the reflective polarizer is higher. In the related art, the reflectance of the backlight for the light traveling from the liquid crystal display panel side to the backlight is not taken into account. For example, when the prism sheet illustrated in FIG. 19 is used, since the reflectance in the front direction of the backlight is low, the effect of luminance increase obtained when the reflective polarizer is provided is low.

It is an object of the present invention to solve the problems and realize a high-luminance backlight (lighting device) using a new optical sheet. In other words, it is an object of the present invention to provide a technique that can set, in a backlight (a lighting device) of the edge light type, an angle at which luminance is maximized in substantially the front direction, reduce luminance unevenness near light sources and changes in colors due to an observing direction, and further increase the luminance.

It is another object of the present invention to provide a technique that can increase, in a liquid crystal display device including the backlight of the edge light type, the luminance in the front direction, in particular, when a reflective polarizer is provided.

The above-mentioned and other objects and new characteristics of the present invention will be made apparent by the description of this specification and the accompanying drawings.

A lighting device according to the present invention includes: a light source; a light guide provided adjacent to the light source and including a light source light incident surface on which light emitted by the light source enters and a planar light emission surface from which planar light is emitted; and an optical sheet arranged to be opposed to the planar light emission surface of the light guide, including a planar light incident surface on which the planar light enters, and configured to change a traveling direction of the planar light emitted from the light guide because a light emission side of the optical sheet where the light entering from the planar light incident surface is emitted has a shape in which plural columnar prisms extending in parallel to the light source light incident surface, in other words, plural prism rows, ridgelines of which are substantially parallel to the longitudinal direction of the light source light incident surface, are arranged side by side. In a prism forming the prism rows, a distal surface, which is a surface on a side relatively far from the light source when viewed from a ridgeline of the prism, has at least different two kinds of inclination angles.

In the lighting device according to the present invention, in the columnar prism, an inclination angle represented in a range of 0° to 90° formed with the planar light incident surface by a proximal surface, which is a surface on a side relatively close to the light source viewed from the ridgeline of the prism, can substantially coincide with an angle represented in a range of 0° to 90° formed with the planar light incident surface by one distal surface among the plural distal surfaces.

In the lighting device according to the present invention, in the columnar prism, an angle represented in a range of 0° to 90° formed with the planar light incident surface by a proximal surface, which is a surface on a side relatively close to the light source viewed from the ridgeline of the prism, can be larger than an angle represented in a range of 0° to 90° formed with the planar light incident surface by any one distal surface among the plural distal surfaces.

Alternatively, in the lighting device according to the present invention, in the columnar prism, an angle represented in a range of 0° to 90° formed with the planar light incident surface by a proximal surface, which is a surface on aside relatively close to the light source viewed from the ridgeline of the prism, can be larger in a range of an angle equal to or larger than 0° and equal to or smaller than 10° with respect to an angle represented in a range of 0° to 90° formed with the planar light incident surface by a distal surface having a highest ratio of an occupied area when projected on the planar light incident surface among the plural distal surfaces.

In the lighting device according to the present invention, a difference $\Delta\phi$ between the at least different two kinds of inclination angles of the plural distal surfaces can be $4°\leq\Delta\phi\leq20°$. Further, the difference $\Delta\phi$ may be $5°\leq\Delta\phi\leq15°$.

In the lighting device according to the present invention, the columnar prism can have three distal surfaces having different three kinds of inclination angles, and differences $\Delta\phi13$ and $\Delta\phi35$ between inclination angles of two distal surfaces having close inclination angles among the three distal surfaces can be $4°\leq\Delta\phi13\leq20°$ and $4°\leq\Delta\phi35\leq20°$. Further, the differences $\Delta\phi13$ and $\Delta\phi35$ may be $5°\leq\Delta\phi13\leq15°$ and $5°\leq\Delta\phi35\leq15°$.

In the lighting device according to the present invention, in the columnar prism, all angles represented in a range of 0° to 90° formed with the planar light incident surface by a surface (a proximal surface) on a side relatively close to the light source viewed from the ridgeline of the prism may substantially coincide with an angle represented in a range of 0° to 90° formed with the planar light incident surface by a distal surface having a highest ratio of an occupied area when projected on the planar light incident surface among the plural distal surfaces.

In the lighting device according to the present invention, when the plural distal surfaces are projected on the planar light incident surface, a ratio of an area occupied by any one of the distal surfaces on the planar light incident surface can be 10 to 30%. Further, the ratio may be 20 to 25%.

A display device according to the present invention is a display device including any one of the lighting devices explained above and a display panel arranged in a traveling direction of light emitted from the lighting device.

A liquid crystal display device according to the present invention includes any one of the lighting devices explained above and a liquid crystal display panel arranged in a traveling direction of light emitted from the lighting device. The liquid crystal display panel includes a pair of polarizers arranged across a liquid crystal layer. An angle formed with the ridgeline direction by the direction of an absorption axis of a polarizer arranged in a position close to the lighting device of the pair of polarizers is smaller than an angle formed with a direction orthogonal to the ridgeline direction by the direction of the absorption axis.

In the liquid crystal display device according to the present invention, the liquid crystal display panel can further include a reflective polarizer on the lighting device side. A reflection axis of the reflective polarizer can be substantially parallel to the absorption axis of the polarizer arranged in the position close to the lighting device.

In the liquid crystal display device according to the present invention, the liquid crystal display panel can further include a diffusion adhesive between the polarizer arranged in the position close to the lighting device and the reflective polarizer.

According to the present invention, it is possible to realize the lighting device in which changes in colors due to luminance unevenness near the light source and an observing direction are small and the luminance in the front direction is high.

With the liquid crystal display device according to the present invention, it is possible to increase the luminance in the front direction effectively using of light from the backlight.

BRIEF DESCRIPTION OF THE DRAWINGS

FIG. 19 is a schematic sectional view showing the cross-sectional shape of a prism of a prism sheet in the past.

DETAILED DESCRIPTION OF THE INVENTION

Figure 1:
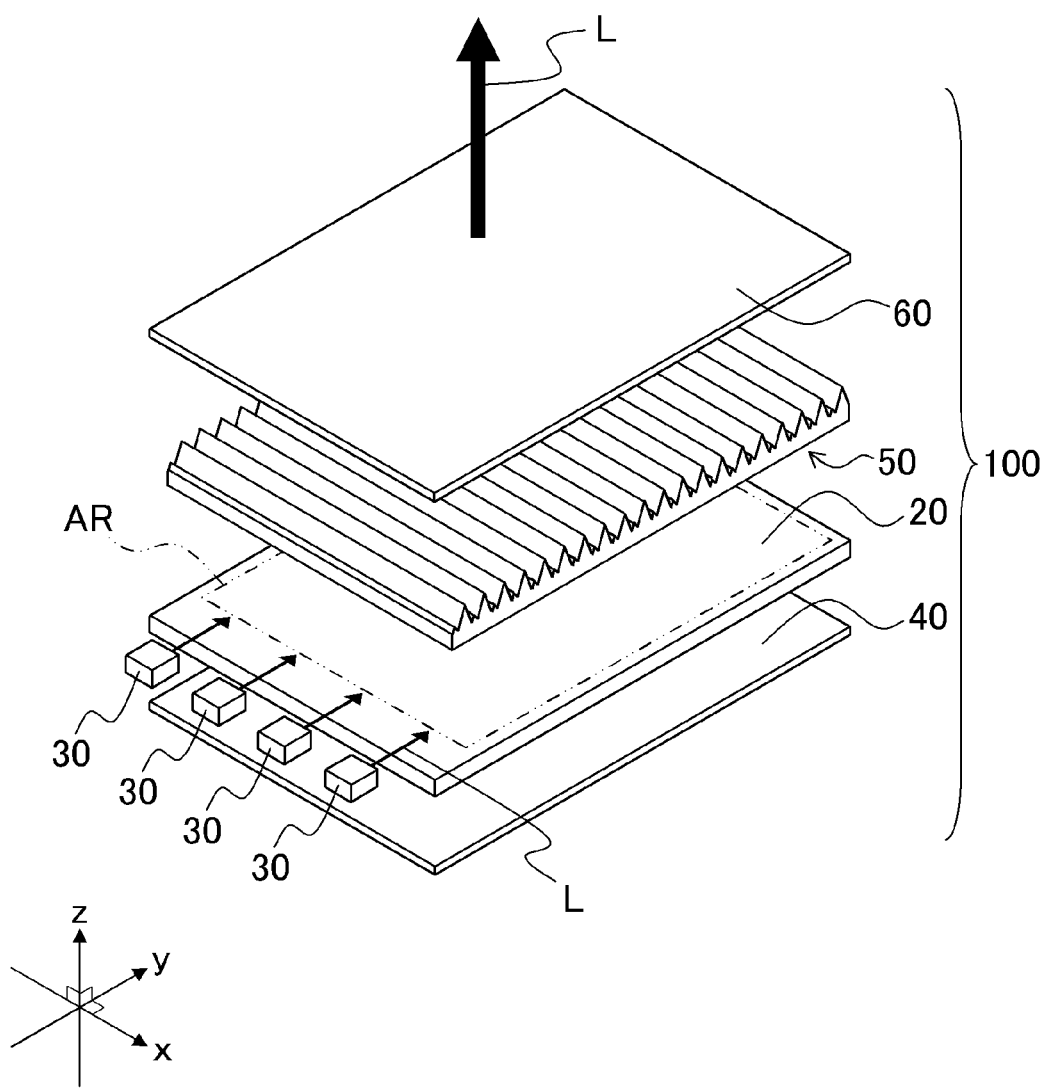
FIG. 1 is a schematic perspective view showing a schematic configuration of a main part in a lighting device according to a first embodiment of the present invention.

First, before embodiments are explained concerning main components included in a lighting device (a backlight) according to the present invention, an overview of the lighting device is explained. The lighting device according to the present invention includes at least a light source that emits a point-like or linear light, a light guide that converts the light emitted by the light source (hereinafter referred to as light source light) into planar light and emits the planar light, and an optical sheet that changes a traveling direction of lights emitted from the light guide.

The light source is arranged on a light source light incident surface, which is one end face, of the light guide. The optical sheet is provided on a planar light emission surface side, which is the front surface, of the light guide and includes plural prism rows on a surface on the opposite side of the light guide. The direction of ridgelines of the prism rows is substantially parallel to the longitudinal direction of the light source light incident surface of the light guide on which the light source is arranged. In the cross-sectional shape of a prism forming the prism rows, a distal surface on a side relatively far from the light source viewed from a ridgeline of the prism includes at least two kinds of inclination angles.

Desirably, an inclination angle of a proximal surface on a side relatively close to the light source viewed from the ridgeline of the prism is caused to substantially coincide with an inclination angle of at least one of two distal surfaces on the side far from the light source.

Alternatively, an angle represented in a range of 0° to 90° formed with the planar light incident surface by the surface (the proximal surface) relatively close to the light source viewed from the ridgeline of the prism is set to an angle larger in a range of an angle equal to or larger than 0° and equal to or smaller than 10° with respect to an angle represent in a range of 0° to 90° formed with the planar light incident surface by a distal surface having a highest ratio of an occupied area when projected on the planar light incident surface.

The configuration explained above acts as explained below in the lighting device according to the present invention. Light emitted from the light source and entering on the light source light incident surface of the light guide is emitted from the front surface side of the light guide as planar light while being guided in the light guide. An angle at which luminance or luminous intensity is maximized (a peak angle) of lights emitted from the light guide shifts from a direction perpendicular to the planar light emission surface of the light guide, i.e., the front direction. Specifically, the angle at which luminance or luminous intensity is maximized tilts about 60 to 80 degrees toward a main direction in which the light emitted from the light source and the light entering on the light guide travels in the light guide. Therefore, the lights emitted from the light guide and entering on the optical sheet enter from a direction oblique to the rear surface of the optical sheet, i.e., the planar light incident surface. The lights entering on the optical sheet are refracted by the prism formed on the planar light incident surface and the front surface side (a light emission surface side) of the optical sheet. The traveling direction of the lights changes to a direction closer to the front direction.

In this case, most of lights emitted from the light guide and having the angle at which luminance or luminous intensity is maximized and an angle near the angle enter on the distal surface relatively far from the light source viewed from the ridgeline of the prism on the front surface side, i.e., the light emission side of the prism sheet and are refracted in a direction close to the front direction. In the present invention, the distal surface relatively far from the light source viewed from the ridgeline of the prism has at least two kinds of different inclination angles. In this case, the light refracted to the front direction and a direction near the front direction on the front surface side of the prism sheet is light in which at least two kinds of refraction angles are mixed. In other words, changes of different colors that occur in the refraction are mixed and averaged, whereby changes in colors due to wavelength dispersion of the prism are suppressed.

An optimum range is present for a difference $\Delta\phi$ between inclination angles of the distal surface on the side relatively far from the light source viewed from the ridgeline of the prism.

In the following explanation, in the cross-sectional shape of the prism, the distal surface on the side relatively far from the light source viewed from the ridgelines of the prism includes two kinds of distal surfaces A and B having different inclination angles. When the difference $\Delta\phi$ between the inclination angles is small, a difference between directions in which the light entering on the prism sheet is refracted on the distal surface A and the distal surface B is small. In other words, a difference between refraction angles of light refracted on two distal surfaces having different inclination angles is small. Therefore, an effect of suppression of a color change obtained by mixing of lights having different refraction angles is small. Although depending on a refractive index and wavelength dispersion of a transparent material forming the prism in a strict sense, in general, when the difference $\Delta\phi$ between the inclination angles is smaller than 4°, changes in colors that occur when an observing direction is changed are at a level at which the changes are clearly recognized. Therefore, it is necessary to set the difference $\Delta\phi$ between the inclination angles to 4° or larger. From the viewpoint of the suppression of a color change, it is desirable to set the difference $\Delta\phi$ between the inclination angles to 5° to 10° or larger.

On the other hand, when the difference $\Delta\phi$ between the inclination angles is large, among lights emitted from the light guide, a difference between a direction in which light traveling at the angle at which luminance or luminous intensity is maximized enters on the prism sheet and refracted on the distal surface A and a direction in which the light is refracted on the distal surface B is large. In other words, the light passing through the prism sheet spreads largely and the luminance in the front direction or the direction near the front direction falls. In an extreme case, two angles at which luminance is maximized are formed and the luminance in the front direction or the direction near the front direction conspicuously falls. Although depending on a refractive index and wavelength dispersion of the transparent material forming the prism in a strict sense, in general, when the difference $\Delta\phi$ between the inclination angles is larger than 20°, two angles at which luminance is maximized clearly appear and the luminance in the front direction or the direction near the front direction substantially falls. Therefore, it is necessary to set the difference $\Delta\phi$ between the inclination angles to 20° or smaller. From the viewpoint of increasing the luminance in the front direction or the direction near the front direction, it is desirable to set the difference $\Delta\phi$ between the inclination angles to 15° or smaller.

Consequently, in the cross-sectional shape of the prism forming the prism sheet, when the distal surface on the side relatively far from the light source viewed from the ridgeline of the prism includes the two kinds of distal surfaces having the different inclination angles, the difference $\Delta\phi$ between the inclination angles of the distal surface desirably satisfies the following relation:

$$4°\leq\Delta\phi\leq20°$$

In order to suppress the changes in colors due to a difference in the observing direction and increase the luminance in the front direction or the direction near the front direction, the difference $\Delta\phi$ between the inclination angles more desirably satisfies the following relation:

$$5°\leq\Delta\phi\leq15°$$

On the other hand, the inclination angle of the proximal surface on the side relatively close to the light source viewed from the ridgeline of the prism is desirably caused to substantially coincide with the inclination angle of one of the two distal surfaces on the side relatively far from the light source. Alternatively, an angle represented in a range of 0° to 90° formed with the planar light incident surface by the proximal surface relatively close to the light source viewed from the ridgeline of the prism is desirably set to an angle larger in a range of an angle equal to or larger than 0° and equal to or smaller than 10° with respect to an angle represent in a range of 0° to 90° formed with the planar light incident surface by a distal surface having a highest ratio of an occupied area when projected on the planar light incident surface. This is for increasing the luminance in the front direction when the lighting device is used as a backlight of a liquid crystal display device.

In the liquid crystal display device, a part of light emitted from the backlight is reflected on a wire or the like of a liquid crystal display panel and returns to the backlight side. When a reflective polarizer is used between the backlight and the liquid crystal display panel, in particular, in addition to the reflection on the liquid crystal display panel, more light is reflected by the action of the reflective polarizer and returns to the backlight side. The light returned to the backlight side is reflected on the backlight, travels to the liquid crystal display panel again, and is reused to contribute to the luminance of the liquid crystal display device.

In this case, as the reflectance of the backlight is larger, in particular, as the more light is reflected toward the front direction or the direction near the front direction, the luminance in the front direction of the liquid crystal display device or the direction near the front direction is higher.

The shape of the prism of the prism sheet arranged in a position close to the liquid crystal display panel relates to the reflectance in the front direction of the backlight. Specifically, the inventors found that the reflectance is increased by setting, in the cross-sectional shape of the prism, the angle of the proximal surface on the side relatively close to the light source viewed from the ridgeline of the prism to a value same as the inclination angle of the distal surface on the side relatively far from the light source (the direction of the inclination is the opposite direction). In other words, when a perpendicular drawn from the ridgeline of the prism to the planar light emission surface is assumed, in the cross-sectional shape of the prism, the angle of the proximal surface on the side relatively close to the light source viewed from the ridgeline of the prism and the inclination angle of the distal surface on the side relatively far from the light source are desirably set in a symmetrical relation with respect to this line. In this case, since the reflectance in the front direction of the backlight increases, it is possible to obtain higher front luminance in the liquid crystal display device in which the backlight is used.

Even if the proximal surface and the distal surface forming the prism are not in a complete symmetrical relation, such an effect of the increase in the reflectance of the backlight can be obtained to a certain degree under a condition close to this relation. For example, the effect can also be obtained by setting the angle represented in the range of 0° to 90° formed with the planar light incident surface by the proximal surface on the side relatively close to the light source viewed from the ridgeline of the prism to an angle larger in a range of an angle equal to or larger than 0° and equal to or smaller than 10° with respect to an angle represented in a range of 0° to 90° formed with the planar light incident surface by a distal surface having a highest ratio of an occupied area when projected on the planar light incident surface among plural distal surfaces.

In the case of the prism sheet having the configuration explained above, the light passing through the prism sheet is refracted on an interface with the air in two places of the rear surface and the front surface of the prism sheet. Since the transmittance of p-polarized light components in this refraction is higher than the transmittance of s-polarized light components, in the light passing through the prism sheet, a light amount of the p-polarized light components is larger. Therefore, it is possible to obtain illumination light having a large light amount of predetermined linearly polarized light components (p polarized light components).

Concerning the cross-sectional shape of the prism forming the prism sheet, in some case, it is desirable to adopt structure explained below according to necessity. Specifically, the inclination angle of the proximal surface relatively close to the light source viewed from the ridgeline of the prism is desirably set larger than the inclination angle of both the two distal surfaces on the side far from the light source. This is for increasing the luminance in the front direction of the light itself emitted from, the lighting device. In this case, in the light entering on the prism sheet, a ratio of the light entering on the proximal surface on the side relatively close to the light source viewed from the ridgeline of the prism and scatters in directions other than the front direction by refraction or reflection decreases. As a result, the luminance in the front direction can be increased.

The present invention is explained in detail below together with embodiments with reference to the accompanying drawings. In all the figures for explaining the embodiments, components having the same functions are denoted by the same reference numerals and signs and redundant explanation of the components is omitted.

First Embodiment

Figure 2:
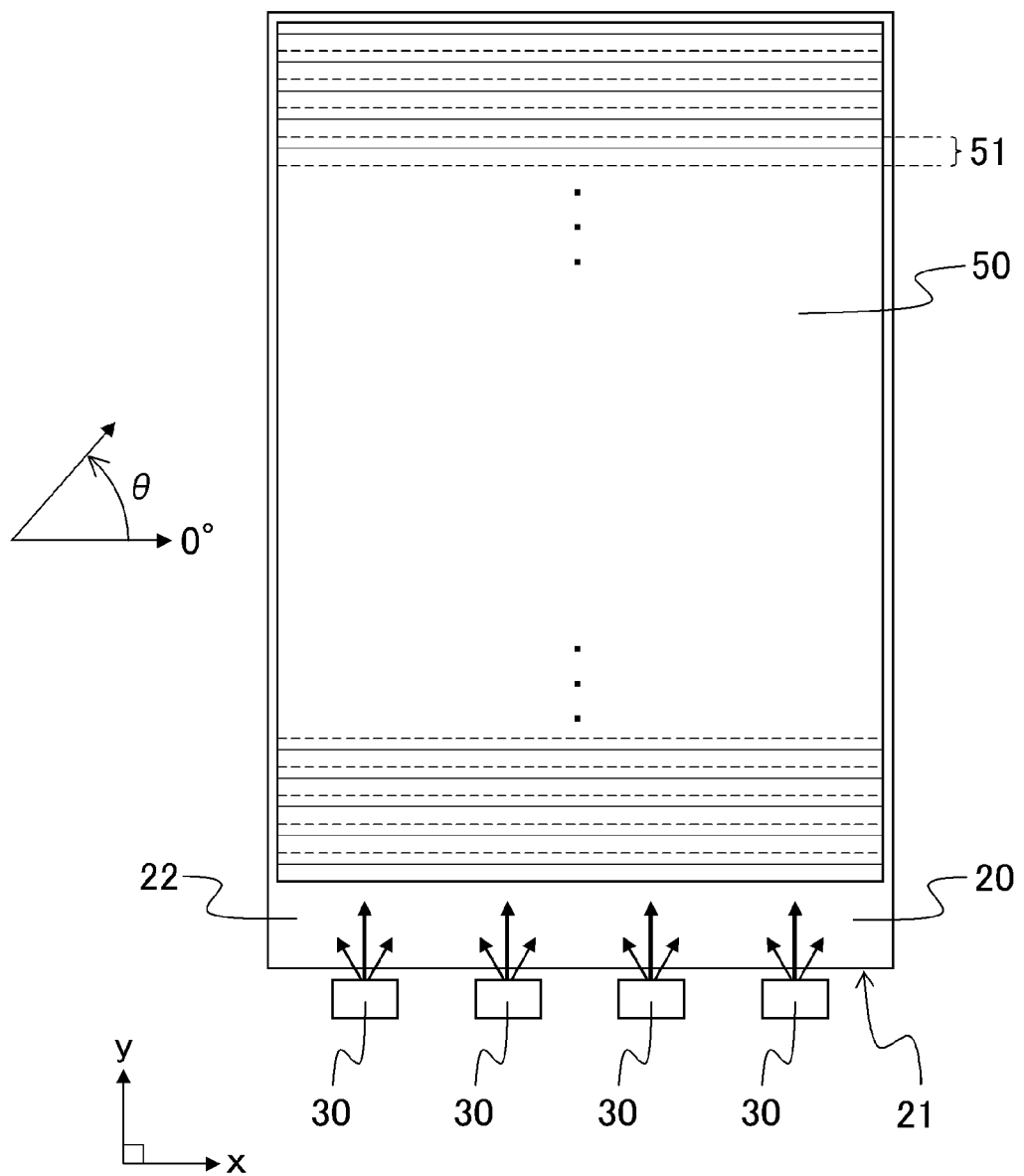
FIG. 2 is a schematic plan view showing an example of a planar configuration of the lighting device.

FIGS. 1 and 2 are schematic diagrams showing a schematic configuration of a lighting device according to a first embodiment of the present invention. FIG. 1 is a schematic perspective view showing a schematic configuration of a main part in the lighting device according to the first embodiment of the present invention. FIG. 2 is a schematic plan view showing an example of a planar configuration of the lighting device. As shown in FIGS. 1 and 2, a lighting device 100 according to the first embodiment includes a light guide 20, plural light sources 30, a reflection sheet 40, and a prism sheet 50 and may include a diffusion sheet 60 according to necessity.

The light guide 20 is a transparent tabular optical component that converts light L emitted by the light source 30 into a planar beam. The light guide 20 is arranged between the reflection sheet 40 and the prism sheet 50 and configured to emit the light L, which is emitted from the light source 30, mainly from a region AR of a planar light emission surface 22 opposed to the prism sheet 50. In the following explanation, a surface opposed to the prism sheet 50 in the light guide 20 is referred to as planar light emission surface 22 and a surface opposed to the reflection sheet 40 is referred to as rear surface.

In the light guide 20, a planar shape of the planar light emission surface is a rectangular shape same as a display region of a liquid crystal display panel, which is an irradiation target. In this specification, a longitudinal direction of a light source light incident surface 21, near which the light source 30 is arranged, in the light guide 20, is represented as x-axis direction and a direction orthogonal to the x-axis direction is represented as y-axis direction. In this specification, a perpendicular direction of the planar light emission surface is represented as z axis direction and the z axis direction from the planar light emission surface (a light emission surface) to the prism sheet 50 is represented as +z direction. A specific configuration of the light guide 20 is explained below.

The light source 30 is desirably a light source that satisfies conditions such as a small size, high light emission efficiency, and low heat generation. Examples of such a light source include a cold cathode fluorescent lamp and a light emitting diode (LED). In the first embodiment, the light emitting diode is used as the light source 30. However, it goes without saying that the present invention is not limited to this.

When the light emitting diode is used as the light source 30, since the light emitting diode is a point-like light source, for example, as shown in FIGS. 1 and 2, the plural (four in FIGS. 1 and 2) light sources 30 are arranged side by side along the light source light incident surface 21 of the light guide 20. It goes without saying that the number of the light sources 30 and a side surface on which the light sources 30 are arranged can be changed as appropriate.

As the light source 30, for example, a light emitting diode that emits white light can be used. As such alight emitting diode, for example, a light emitting diode is known that realizes white light emission by combining a light emitting diode chip that emits blue light and a phosphor that is excited by the blue light emitted by the light emitting diode chip and emits yellow light. Further, as the light emitting diode that emits white light, for example, there is a light emitting diode that realizes white light emission having light emission peak wavelength in blue, green, and red by combining a light emitting diode chip that emits blue light or an ultraviolet ray and a phosphor that is excited by the light emitted by the light emitting diode chip to emit light.

The lighting device 100 according to the first embodiment is a lighting device that is thin and can emit illumination light having a large ratio of predetermined polarized light components. The lighting device 100 is suitable as a backlight of a liquid crystal display device. For example, a liquid crystal display device corresponding to color display can be realized by using the white light emitting diode as the light source 30 and combining the light emitting diode with a color liquid crystal display panel including a color filter. As the light source 30, light emitting diodes that emit three primary colors of red, green, and blue may be combined and used instead of the white light emitting diode. In this case, it is possible to realize a display device having a wide color reproduction range by using the light source 30 having light emission peak wavelength corresponding to a transmission spectrum of the color filter in the liquid crystal display panel.

Alternatively, a color display device may be realized by combining a display panel that realizes color display using field sequential colors and the lighting device according to the first embodiment. In this case, since it is unnecessary to provide a color filter that causes a light loss, it is possible to realize a display device having little light loss and a wide color reproduction range by using, as the light source 30, the light-emitting diodes that emit the three primary colors of red, green, and blue.

Although not shown in the figure, the light source 30 is connected to a control means for controlling a power supply and lighting and light-out through a wire.

The reflection sheet 40 arranged on the rear surface side of the light guide 20 is a reflection sheet for returning light emitted from the rear surface of the light guide 20 to the light guide 20 and effectively using the light. As the reflection sheet 40, for example, a reflection sheet in which a reflection layer having high reflectance is formed on a supporting substrate such as a resin plate or a polymeric film can be used. The reflection layer can be formed by a method of, for example, forming a metal thin film having high reflectance of aluminum, silver, or the like on the supporting substrate with the evaporation method, the sputtering method, or the like, forming a dielectric multilayer film on the supporting substrate to be a reflection increasing film, or coating light reflective paint on the supporting substrate. The reflection layer may be configured to function as a reflecting means by, for example, laminating plural layers of transparent media having different refractive indexes.

The prism sheet 50 arranged on the planar light emission surface side of the light guide 20 is an optical sheet having a function of changing a traveling direction of light emitted from the planar light emission surface (the region AR) of the light guide 20. The prism sheet 50 includes a prism row including plural prisms. As shown in FIGS. 1 and 2, a ridgeline in each of prisms 51 extends in a direction parallel to the longitudinal direction of the light source light incident surface 21, near which the light source 30 is arranged, of the light guide 20. The prism sheet 50 is a most important member in the present invention. Details of the prism sheet 50 are explained below.

The diffusion sheet 60 arranged on the upper side of the prism sheet 50 viewed from the light guide 20 is provided to diffuse the light, the traveling direction of which is changed by the prism sheet 50 and, for example, expand the distribution of emission angles of the light L emitted from the lighting device 100 and improve uniformity of luminance distribution in a light emission plane of the lighting device 100. The diffusion sheet 60 is provided according to necessity and may be a diffusion sheet used in the lighting device in the past. Therefore, specific explanation of the diffusion sheet 60 is omitted.

In FIG. 2, a definition of an azimuth angle θ used in the following explanation is also shown. The azimuth angle θ is 0 degree in the longitudinal direction of the light source light incident surface 21, near which the light source 30 is arranged, of the light guide 20 and is positive in the counter-clockwise direction at the time when the light guide 20 is viewed from above the light emission surface.

Figure 3:
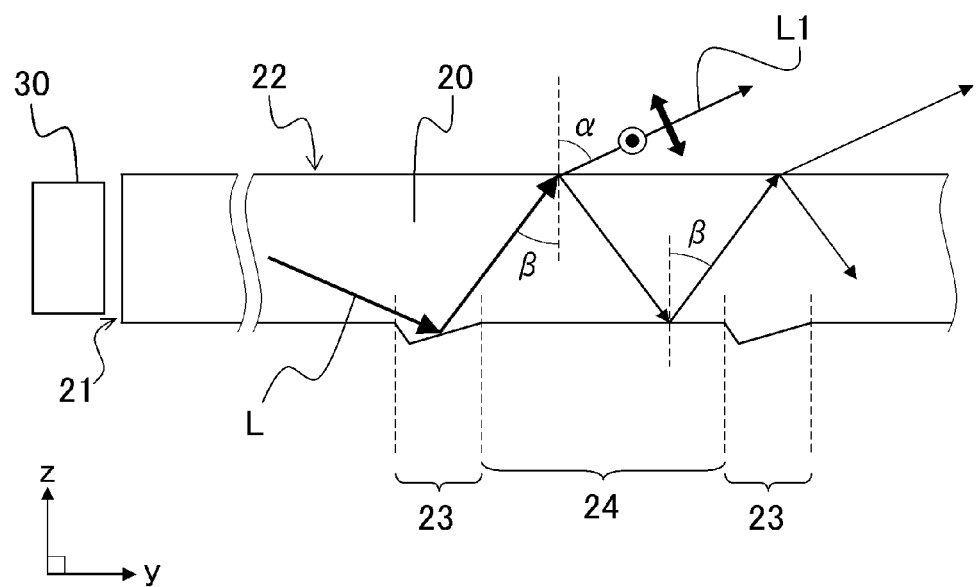
FIG. 3 is a schematic sectional view showing an example of a cross-sectional configuration of a light guide in the lighting device according to the first embodiment.

FIG. 3 is a schematic sectional view showing an example of a cross-sectional configuration of the light guide in the lighting device according to the first embodiment.

In FIG. 3, a cross-sectional configuration viewed on a cross section parallel to a yz plane in a xyz coordinate system shown in FIG. 1 and a configuration viewed in a depth direction of the cross section are shown. As the material of the light guide 20, a material transparent to visible light and having little light loss only has to be used. For example, polyethylene terephthalate resin, polycarbonate resin, cyclic olefin resin, or acrylic resin can be used.

For example, as shown in FIG. 3, the light guide 20 having a function of, while guiding the light L emitted from the light source 30 and entering from the light source light incident surface 21, emitting a part of the light L from the planar light emission surface 22 to convert the light L into a planar shape. In this case, the light guide 20 is formed of a substantially rectangular tabular member transparent to visible light and includes a structure 23 for emitting, from the planar light emission surface 22, the light L entering from the light source light incident surface 21 and guided in the light guide 20 (hereinafter referred to as light extraction structure). In the first embodiment, as an example of the light extraction structure 23, as shown in FIG. 3, a V-shaped structure provided on the rear surface of the light guide 20 is explained.

A publicly-known technique only has to be used for the light extraction structure 23. The light extraction structure 23 can be realized by a structure for changing a traveling angle of the light L guided in the light guide 20 (an incident angle on the planar light emission surface), for example, forming a fine step, an uneven shape, a lens shape, or the like on the rear surface of the light guide 20 or applying dot printing by white pigment to the rear surface. When manufacturing costs of the light guide 20 and efficiency of lights emitted from the light guide 20 are taken into account, it is desirable to form, on the rear surface of the light guide 20, a fine shape for changing a traveling angle of light guided in the light guide 20. The fine shape only has to be a shape including an inclined surface that can change the traveling angle of the light guided in the light guide. The fine shape can be realized by a shape such as a step, unevenness, or a lens shape.

The light L entering on the light guide 20 from the light source light incident surface 21 is guided mainly in the y-axis direction while being totally reflected on the planar light emission surface 22 and the rear surface. At this point, when the light L is reflected on the light extraction structure 23, a traveling angle β (an incident angle on the planar light emission surface 22) after the reflection is smaller than a traveling angle before the reflection. Further, when the traveling angle β is smaller than a critical angle, i.e., a minimum angle that satisfies a total reflection condition, a part (light L1) of the light L is refracted on the planar light emission surface 22 and emitted from the light guide 20 at an emission angle α. At this point, the light L1 emitted from the light guide 20 has p-polarized light components and s-polarized light components. Linearly polarized light components, a vibration direction of an electric vector of which is included in a plane including the perpendicular of the planar light emission surface 22 in the light guide 20 and a traveling direction of the light L1, are defined as the p-polarized light components. Linearly polarized light components, a vibration direction of an electric vector of which is orthogonal to the vibration direction of the electric vector of the p-polarized light components, are defined as the s-polarized light components. In other words, in FIG. 3, a double-headed arrow of a thick solid line attached to the light L1 indicates the vibration direction of the electric vector of the p-polarized light components. A circle including a black circle indicates the vibration direction of the electric vector of the s-polarized light components.

In the light L emitted from the light source 30 and entering on the light guide 20, as illustrated in FIG. 2, components, a traveling direction of which is not parallel to the y-axis direction, are also included. However, most of lights travel from the light source light incident surface 21 of the light guide 20, near which the light source 30 is arranged, in the direction of an end face opposed to the light source light incident surface 21. In other words, a main traveling direction of the light guided in the light guide 20 in this specification is a direction orthogonal to the light source light incident surface 21 of the light guide 20 (the y-axis direction).

Figure 4:
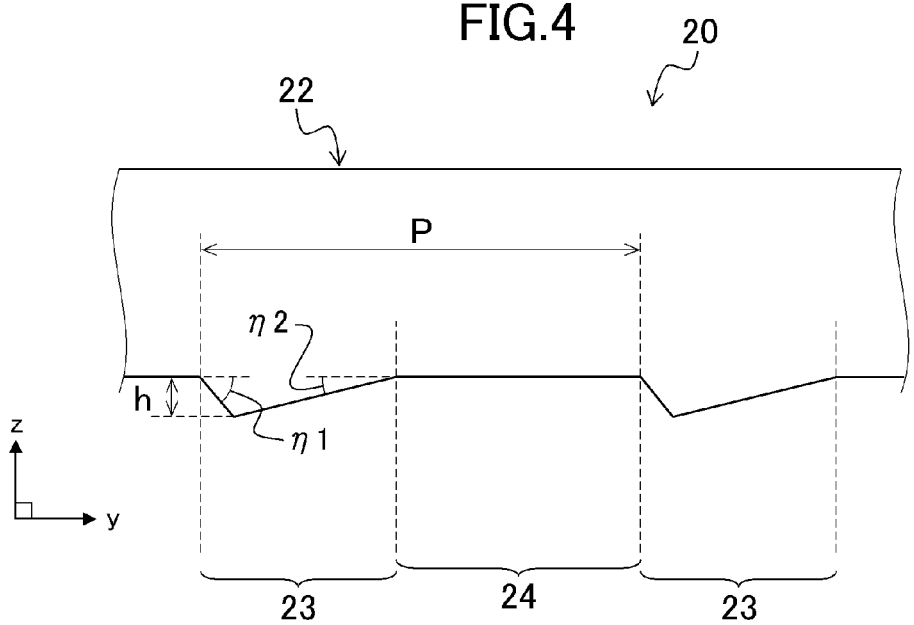
FIG. 4 is a schematic side sectional view for explaining the shape of a light extraction structure in the light guide according to the first embodiment.

FIG. 4 is a schematic side sectional view for explaining the shape of the light extraction structure in the light guide. A cross-sectional configuration viewed on the cross section parallel to the yz plane in the xyz coordinate system shown in FIG. 1, i.e., a cross section parallel to a main traveling direction of light guided in the light guide 20 and a configuration seen in a depth direction of the cross section are shown.

In the first embodiment, a V-shaped structure is explained as an example of the light extraction structure 23. As the light extraction structure 23 provided on the rear surface of the light guide 20, for example, as shown in FIG. 4, a V-shaped structure including two inclined surfaces can be used. The azimuth angle θ of a ridgeline of the V-shaped structure forming the light extraction structure 23 extends in a direction in which the azimuth angle θ is about 0 degree. A region 24 present between two light extraction structures 23 adjacent to each other is a flat surface substantially parallel to a plane formed by the planar light emission surface 22 of the light guide 20. In this case, the light source 30 is arranged on the left side of the light guide 20. An angle η1 of the inclined surface close to the light source 30 of the two inclined surfaces and an angle η2 of the inclined surface far from the light source 30 are different. The angle η1 is larger. The angles η1 and η2 of the inclined surfaces are respectively inclination angles with respect to a surface parallel to the planar light emission surface 22 of the light guide 20.

The light guide 20 in the lighting device 100 according to the first embodiment is configured such that a direction in which an index value (e.g., luminance or luminous intensity) concerning an amount of light emitted from the planar light emission surface 22 of the light guide 20 is maximized is a direction shifting from the perpendicular direction of the planar light emission surface 22 of the light guide 20 in a direction in which the azimuth angle θ is about 90 degrees. An emission angle α of the light emitted from the planar light emission surface 22 of the light guide 20 is defined as an angle with respect to the perpendicular of the planar light emission surface 22 of the light guide 20. Similarly, a traveling angle β of the light traveling in the light guide 20 is defined as an angle with respect to the perpendicular of the planar light emission surface 22 of the light guide 20.

In the lighting device according to the present invention, the light guide 20 is configured such that an index value of the light emitted from the planar light emission surface 22 of the light guide 20 is maximized in a direction in which the azimuth angle θ is about 90 degrees and the emission angle α is 65 degrees to 85 degrees. Such a light guide 20 can be realized by, for example, setting the angle η2 of the inclined surface forming the light extraction structure 23 to about 0.5 degree to 15 degrees. On the other hand, as the angle η1 of the inclined surface forming the light extraction structure 23, an angle at which a loss of the light guided in the light guide 20 is small only has to be selected. Specifically, an appropriate angle only has to be selected from a range of 20 degrees to 90 degrees.

An array pitch P and size (height) h of the light extraction structure 23 only have to be set such that lights emitted from the light guide 20 are substantially uniform in the plane of the planar light emission surface 22. For example, it is realistic to select the pitch P from a range of several ten micrometers to hundred and several ten micrometers and select the height h from a range of several micrometers to several hundred micrometers. The pitch P and the height h may be changed as appropriate according to the position of the light guide 20.

When the emission angle α of light at which luminance or luminous intensity is maximized among the lights emitted from the light guide 20 tilts with respect to the perpendicular (normal) direction of the planar light emission surface 22 in the light guide 20, the light emitted at the emission angle α has a large ratio of the p-polarized light components. The p-polarized light components are more than the s-polarized light components in the light L1 emitted in the direction tilting with respect to the perpendicular direction of the planar light emission surface 22 of the light guide 20 in this way. This is because transmittance in refraction of light on an interface between the planar light emission surface 22 of the light guide 20 and the air layer is different between the p-polarized light and the s-polarized light. This is generally known. As explained above, the luminance or the luminous intensity of the light L1 emitted from the light guide 20 is the maximum when the azimuth angle θ in the traveling direction of the light L1 is 90 degrees. Therefore, in the following explanation, attention is paid to light traveling in this direction. Unless specifically noted otherwise, linearly polarized light having a vibration direction of an electric vector in a plane including the perpendicular (the normal) of the planar light emission surface 22 of the light guide 20 and a direction in which the azimuth angle θ is 90 degrees (the y-axis direction) is referred to as p-polarized light. Linearly polarized light having a vibration direction of an electric vector orthogonal to the vibration direction of the electric vector of the p-polarized light is referred to as s-polarized light.

When the luminance of lights emitted from the light guide 20, the prism sheet 50, or the like is measured through an analyzer (a polarizer) while rotating the analyzer, maximum luminance is represented as Imax and minimum luminance is represented as Imin. A polarization degree ρ is represented by Formula 1 below.

$$\rho = (I\max - I\min)/(I\max + I\min) \quad 1$$

In this specification, as explained above, luminance at the time when an absorption axis of the analyzer and the p-polarized light are orthogonal to each other is represented as Ipmax and the luminance of the light at the time when the absorption axis and the p-polarized light are parallel to each other is represented as Ipmin. A polarization degree with respect to the p-polarized light (a polarization degree of the p-polarized light) ρp is defined by Formula 2 below.

$$\rho p = (I p\max - I p\min)/(I p\max + I p\min) \quad 2$$

For example, in the light guide 20 in which the material is polycarbonate and η2 is set to about 2°, an angle at which the luminance of lights emitted from the light guide 20 is maximized is α=74° and a polarization degree with respect to the p-polarized light at the angle is about ρp=10%. A light guide that emits lights with a high ratio of the p-polarized light components can be realized.

Figure 5:
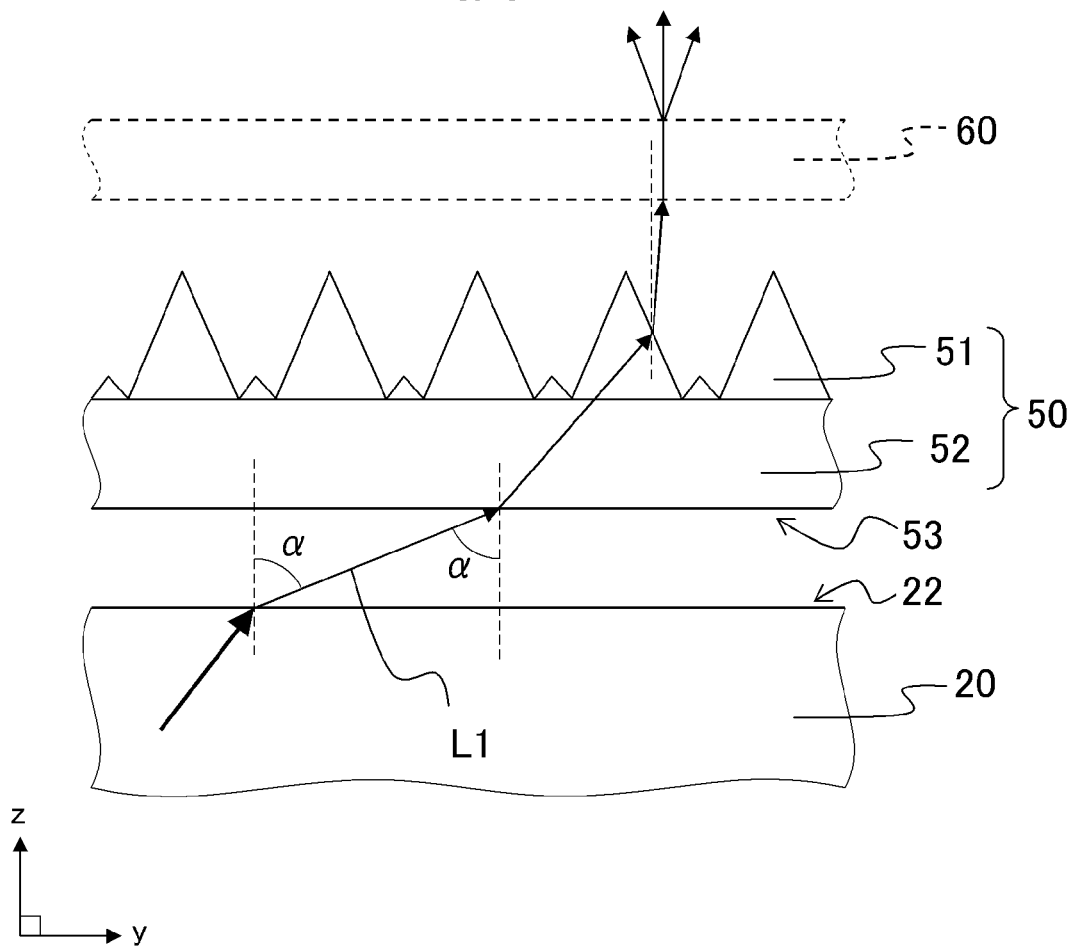
FIG. 5 is a schematic sectional view showing an example of a schematic configuration of a prism sheet in the lighting device according to the first embodiment.

The structure of the prism sheet 50 according to the present invention is explained in detail. FIG. 5 is a schematic sectional view showing an example of a schematic configuration of the prism sheet in the lighting device according to the first embodiment of the present invention. In FIG. 5, a cross-sectional configuration viewed on the cross section parallel to the yz plane in the xyz coordinate system shown in FIG. 1, i.e., the cross section parallel to the main traveling direction of the light guided in the light guide 20 is shown.

As the prism sheet 50, when industrial usefulness such as productivity is taken into account, as illustrated in FIG. 5, it is realistic to use a prism sheet in which a transparent film having the planar light incident surface 53 is a substrate 52 and prisms 51 are formed on the surface of the substrate 52 in a row. However, the present invention specifies the cross-sectional shape of a prism and does not specify the structure and a manufacturing method of the prism. For example, a substrate section and a prism section may be indivisible integrally molded sections.

When the prism sheet in which the transparent film is the substrate 52 and the prisms 51 are formed on the surface of the substrate 52 in a row is used as the prism sheet 50, as the substrate 52 and the prisms 51, it is desirable to use transparent bodies in which a phase difference does not occur in p-polarized light components of light passing through the prism sheet 50. This is for suppressing a change from occurring in p-polarized light emitted from the light guide 20 and passing through the prism sheet 50 to cause a loss of the p-polarized light components and for emitting light having a larger ratio of the p-polarized light components from the prism sheet 50.

As the substrate 52, an optically isotropic transparent body having little refractive index anisotropy at least in a plane such as a triacetylcellulose film or a non-stretched polycarbonate film can be used. Further, as the substrate 52, a transparent body having uniaxial anisotropy of a refractive index in a plane by stretching a film formed of polycarbonate resin or olefin resin in one direction can also be used. When the transparent body having the uniaxial anisotropy of a refractive index is used as the substrate 52, in order to prevent a phase difference from occurring in the p-polarized light passing the prism sheet 50, when the prism sheet 50 is arranged, it is important to set the direction of a slow axis of the substrate 52 in a direction in which the azimuth angle θ is 0 degree or a direction in which the azimuth angle θ is 90 degrees.

It is extremely industrially useful to use, as the substrate 52, a PET (polyethylene terephthalate) film that is relatively inexpensive and easy to handle. However, since the PET film has biaxial anisotropy, when the PET film is used as the substrate 52, special consideration is necessary in order to prevent a phase difference from occurring in the p-polarized light passing through the prism sheet 50. When a transparent body having biaxial anisotropy is used as the substrate 52, by setting a slow axis of the substrate 52 to the azimuth angle θ of 0 degree or 90 degrees, with respect to the p-polarized light traveling in the direction in which the azimuth angle θ is 90 degrees, it is possible to prevent a problem in that a phase difference occurs and the p-polarized light components decrease. Further, by setting the azimuth angle θ of the slow axis to 0 degree, a phase difference that occurs in the p-polarized light decreases in a range of a wider azimuth angle including the azimuth angle of 90 degrees. Therefore, there is an effect that it is possible to suppress a loss of the p-polarized light in a wider angle range.

When the transparent body is used as the substrate 52 of the prism sheet 50, if an angle distribution of the lights emitted from the light guide 20 is taken into account, an angle range that should be specially examined concerning the light passing through the prism sheet 50 is a range in which the azimuth angle θ is 0 degree±15 degrees and the incident angle α is 60 degrees to 85 degrees. Therefore, when the transparent body having biaxial anisotropy such as the PET film is used as the substrate 52 of the prism sheet 50, it is desirable to set an azimuth angle of the slow axis of the substrate 52 to 0 degree or 90 degrees, i.e., set the direction of the slow axis parallel or orthogonal to a ridgeline direction of the prisms 51. Further, if the azimuth angle of the slow axis is set to 0 degree as explained above, since more p-polarized light can be emitted from the prism sheet 50, it is more desirable to set the direction of the slow axis of the transparent body (the substrate 52) parallel to the ridgeline direction of the prisms 51. To obtain a higher effect, it is desirable to cause the ridgeline direction of the prism 51 and the direction of the slow axis of the substrate 52 to meet the conditions explained above. However, it is conceivable that fluctuation occurs and an angle shifts in an actual product. In this case, fluctuation of about ±5 degrees is allowable.

When the transparent body having biaxial anisotropy is used as the substrate 52 of the prism sheet 50 in this way, a large difference occurs between effects obtained when the azimuth angle of the slow axis is set to 0 degree and when the azimuth angle of the slow axis is set to 90 degrees. This is contrastive to the fact that, when the transparent body having uniaxial anisotropy is used as the substrate 52, even if the azimuth angle of the slow axis is 90 degrees, a loss of the p-polarized light is suppressed in the same manner as the suppression of a loss in the case of the azimuth angle of 0 degree.

Figure 6:
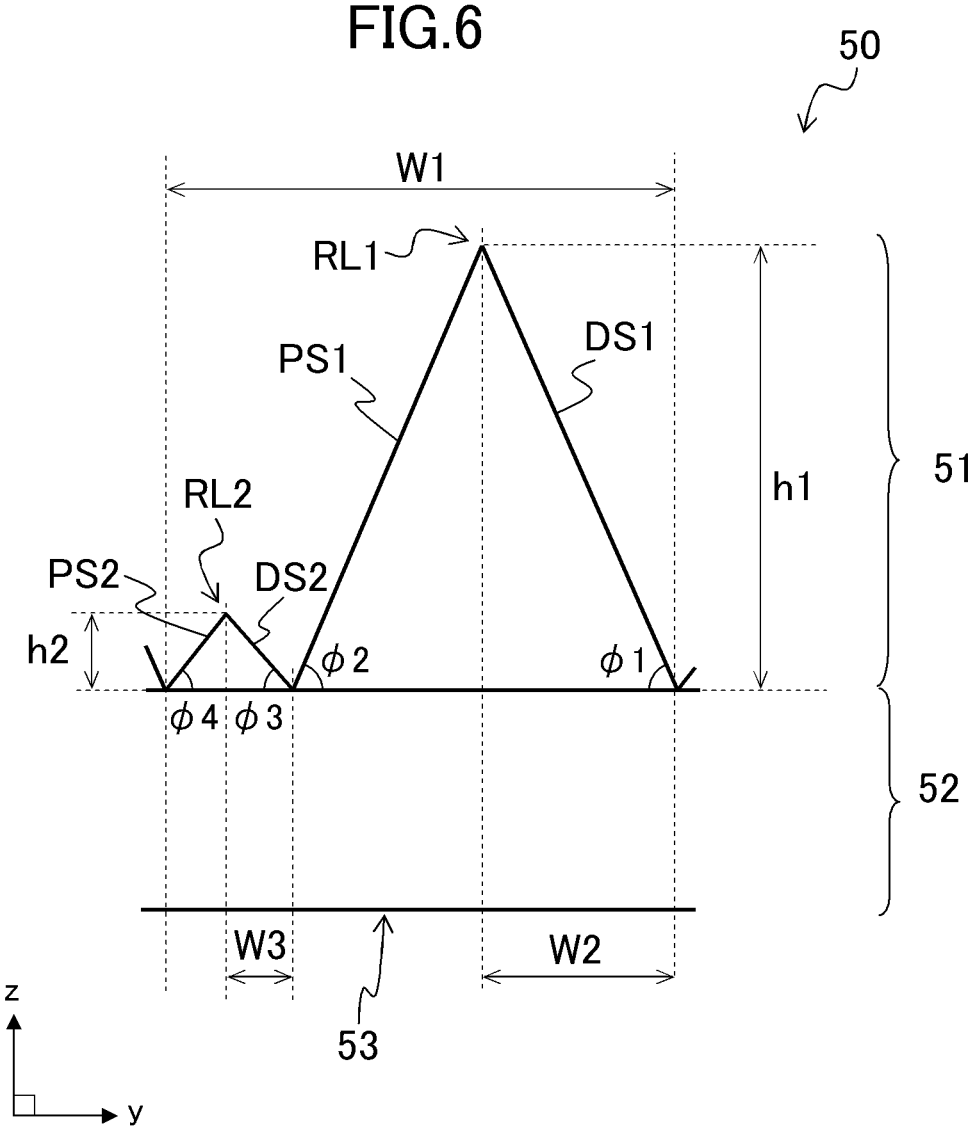
FIG. 6 is a schematic sectional view showing an example of the cross-sectional shape of a prism in the prism sheet according to the first embodiment.

FIG. 6 is a schematic sectional view showing an example of the cross-sectional shape of the prism in the prism sheet. The prism 51 section in the prism sheet 50 shown in FIG. 5 is shown in enlargement. The prism sheet 50 in the lighting device 100 according to the present invention is characterized in that, in the cross-sectional shape of a prism of a prism row formed on the front surface side of the prism sheet 50, a distal surface DS, which is an inclined surface on a side relatively far from a light source viewed from a ridgeline RL of the prism, includes at least two kinds of inclination angles. The prism sheet 50 is characterized in that, more desirably, in the cross-sectional shape of the prism, an inclination angle of a proximal surface PS, which is an inclined surface on a side relatively close to the light source viewed from the ridgeline RL of the prism, substantially coincides with any one inclination angle of the inclination angles of the distal surface DS.

In the first embodiment, this structure is realized by combining two kinds of prism rows. Specifically, the cross-sectional shape of the prism is realized by a shape in which two kinds of isosceles triangles having different base angles are arranged side by side.

The prism 51 in the prism sheet 50 according to the first embodiment includes two ridgelines RL1 and RL2. Inclination angles $\phi 1$ and $\phi 3$ of a distal surface DS1 and a distal surface DS2 on a side relatively far from the light source 30 viewed from the respective ridgelines are set different from each other. Both the distal surfaces DS1 and DS2 forming the cross-sectional shape of the prism 51 have a function of refracting, when light having an angle at which luminance or luminous intensity is maximized among lights emitted from the light guide enters on the prism sheet, the light to the front direction or a direction (a +z direction) near the front direction and include inclination angles for the function.

On the other hand, inclination angles $\phi 2$ and $\phi 4$ of proximal surfaces PS1 and PS2 on a side relatively close to the light source 30 viewed from the two ridgelines RL1 and RL2 forming the prism 51 are angles respectively substantially equal to the inclination angles $\phi 1$ and $\phi 3$ or substantially equal to one of the inclination angles $\phi 1$ and $\phi 3$.

Figure 7:
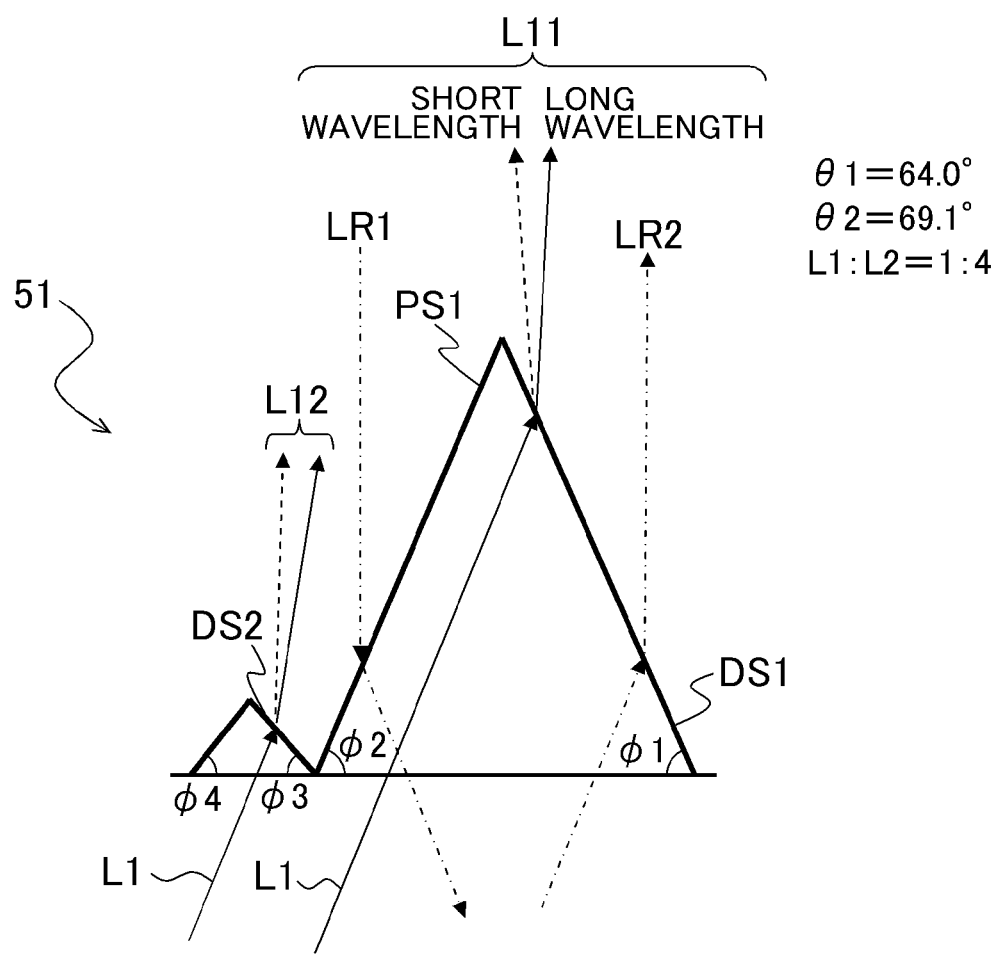
FIG. 7 is a schematic sectional view for explaining the action of the prism in the prism sheet according to the first embodiment.

The action of the prism sheet 50 according to the first embodiment is explained with reference to FIG. 7. FIG. 7 is a schematic sectional view showing an example of the cross-sectional shape of the prism in the prism sheet. Most of lights L1 emitted from the light guide 20 and entering on the prism sheet 50 enter on the distal surfaces DS1 and DS2 of the prism. The lights entering on the distal surfaces DS1 and DS2 are refracted on interfaces with the air and travel in the front direction or the direction (the +z direction in the figure) near the front direction.

In this case, light L11 passing through the distal surface DS1 and light L12 passing through the distal surface DS2 have different inclination angles of the respective distal surfaces. Therefore, even lights traveling in the same direction after passing through the prism sheet 50 have different refraction angles on the prism if the lights pass through different inclined surfaces. The wavelength (color) of light refracted on the prism is different according to a refraction angle because of wavelength dependency (wavelength dispersion) of a refractive index of a transparent material forming the prism. Therefore, if lights having different refraction angles are mixed, an effect is obtained that changes in colors that occur in refraction are averaged and the changes in colors due to the observing direction are suppressed.

An optimum range is present for a difference $\Delta\phi$ ($=|\phi 1-\phi 3|$) between the inclination angles of the distal surfaces on the side relatively far from the light source viewed from the ridgeline of the prism. When the difference $\Delta\phi$ between the inclination angles is small, a difference between a direction in which light entering on the prism sheet is refracted on the distal surface DS1 and a direction in which the light is refracted on the distal surface DS2 is small. In other words, since a difference between the refraction angles of the lights refracted on the two distal surfaces having the different inclination angles is small, the suppression effect of a color change obtained by the mixing of the lights having the different refraction angles is small.

Although depending on an absolute value of a refractive index and wavelength dispersion of the transparent material forming the prism in a strict sense, in general, when the difference $\Delta\phi$ between the inclination angles is smaller than 4°, the changes in colors that occur when the observing direction is changed can be clearly recognized. Therefore, it is necessary to set the difference $\Delta\phi$ between the inclination angles to 4° or larger. From the viewpoint of the suppression of a color change, it is desirable to set the difference $\Delta\phi$ between the inclination angles to 5° or larger.

On the other hand, when the difference $\Delta\phi$ between the inclination angles is large, among lights emitted from the light guide, a difference between a direction in which light traveling at the angle at which luminance or luminous intensity is maximized enters on the prism sheet and refracted on the distal surface DS1 and a direction in which the light is refracted on the distal surface DS2 is large. In other words, the light passing through the prism sheet spreads largely and the luminance in the front direction or the direction near the front direction falls. In particular, when the difference $\Delta\phi$ between the inclination angles is larger than 20°, two angles at which luminance is maximized clearly appear and the luminance in the front direction or the direction near the front direction substantially falls.

Therefore, although depending on a refractive index and wavelength dispersion of the transparent material forming the prism in a strict sense, it is necessary to set the difference $\Delta\phi$ between the inclination angles to 20° or smaller. From the viewpoint of increasing the luminance in the front direction or the direction near the front direction, it is desirable to set the difference $\Delta\phi$ between the inclination angles to 15° or smaller.

Consequently, in the cross-sectional shape of the prism 51 forming the prism sheet 50, the difference $\Delta\phi$ between the inclination angles desirably satisfies the following relation:

$$4°\leq\Delta\phi\leq20°$$

In order to suppress the changes in colors due to a difference in the observing direction and increase the luminance in the front direction or the direction near the front direction, the difference $\Delta\phi$ between the inclination angles more desirably satisfies the following relation:

$$5°\leq\Delta\phi\leq15°$$

On the other hand, the inclination angles $\phi2$ and $\phi4$ of the proximal surfaces PS1 and PS2 on the side relatively close to the light source viewed from the ridgelines RL1 and RL2 of the prism are caused to substantially coincide with the inclination angle of one of the two distal surfaces DS1 and DS2. This is for increasing the luminance in the front direction when the lighting device is used as a backlight of a display device.

In the display device, a part of light emitted from the backlight is reflected on a wire of a display panel or the like and returns to the backlight side. When a reflective polarizer is provided between the backlight and the display panel, in particular, in addition to the reflection on the display panel, more light is reflected by the action of the reflective polarizer and returns to the backlight side. The light returned to the backlight side is reflected on the backlight, travels to the display panel again, and is reused to contribute to the luminance of the display device.

In this case, as the reflectance of the backlight is larger, in particular, as the more light is reflected toward the front direction or the direction near the front direction, the luminance in the front direction of the display device or the direction near the front direction is higher. The shape of the prism of the prism sheet arranged in a position close to the display panel relates to the reflectance in the front direction of the backlight. Specifically, the luminance can be increased by setting, in the cross-sectional shape of the prism, the angle of the proximal surface PS on the side relatively close to the light source viewed from the ridgeline RL of the prism to a value same as the inclination angle of the distal surface DS on the side relatively far from the light source (the direction of the inclination is the opposite direction). In other words, when a perpendicular drawn from the ridgeline RL of the prism to the planar light emission surface 22 is assumed, in the cross-sectional shape of the prism, the inclination angle of the proximal surface PS and the inclination angle of the distal surface DS are desirably set in a symmetrical relation with respect to this line.

In the first embodiment, the inclination angles $\phi2$ and $\phi4$ of the proximal surfaces PS1 and PS2 on the side relatively close to the light side respectively viewed from the ridgelines RL1 and RL2 of the prism are respectively set substantially equal to the inclination angles $\phi1$ and $\phi3$ of the distal surfaces DS1 and DS2 on the side relatively far from the light source. In this case, as illustrated in FIG. 7, for example, when the light LR1 entering on the proximal surface PS1 from a light emission direction (the +z axis direction) side of the prism sheet 50 is reflected on the rear surface (a surface on the light guide side) of the prism sheet 50 and returns to the prism 51, a part of the light enters on the distal surface DS1 and travels in the light emission direction (the +z axis direction). Therefore, the reflectance of the light traveling to the front direction of the lighting device 100 or the direction near the front direction increases.

In the liquid crystal display device in which the lighting device having high reflectance is used as the backlight in this way, light reflected on the liquid crystal display panel or the reflective polarizer and returning to the backlight side is reflected to the front direction or the direction near the front direction and is reused. Therefore, an effect is obtained that it is possible to realize a liquid crystal display device having higher luminance in the front direction or the direction near the front direction.

In the case of the prism sheet 50 according to the first embodiment, the light passing through the prism, sheet 50 is refracted on the interface with the air in two places of the rear surface and the front surface of the prism sheet 50. Since the transmittance of p-polarized light components is higher than the transmittance of s-polarized light components in this refraction, a light amount of the p-polarized light components of the light passing through the prism sheet 50 increases. Therefore, it is possible to obtain illumination light having a large light amount of predetermined linearly polarized light components (the p-polarized light components).

A pitch (entire width W1) of the prism row and height h1 of the prism 51 are practically about several ten micrometers. Specific dimensions and inclination angles of the prism 51 only have to be selected by effectively using an optical simulation or the like according to the refractive index of the transparent bodies forming the substrate 52 and the prism 51 in the prism sheet 50.

An example of the dimensions and the inclination angles of the prism 51 are as explained below. First, the entire width W1 in the prism 51 is set to 35 μm, the height h1 is set to about 36.7 μm, the inclination angle $\phi1$ and the inclination angle $\phi2$ of the distal surface DS1 and the proximal surface PS1 are set to 69.1°, and the inclination angle $\phi3$ and the inclination angle $\phi4$ of the distal surface DS2 and the proximal surface PS2 are set to 64°. In this case, the difference $\Delta\phi$ between the inclination angles is 5.1° and satisfies the conditions explained above. Width (width of projection on the y axis, i.e., the planar light incident surface) W2 in an xy plane corresponding to the distal surface DS1 is set to 28 μm and width (width of projection on the y axis, i.e., the planar light incident surface) W3 in the xy plane corresponding to the distal surface DS2 is set to 7 μm. Height (height of projection on the z axis) h2 of the distal surface DS2 and the proximal surface PS2 is about 7.18 μm.

A ratio of the distal surface DS1 and the distal surface DS2 is equivalent to a ratio of the width W2 and the width W3 corresponding to the respective distal surfaces. In this embodiment, W2:W3=4:1 (a ratio of W3 is 20%). When the ratio of W2 is increased, the luminance in the front direction or the direction near the front direction increases. However, the changes in colors that occur when the observing direction is changed increase. On the other hand, when the ratio of W2 is reduced, the changes in colors that occur when the observing direction is changed decrease. However, the luminance in the front direction or the direction near the front direction decreases. In other words, the changes in colors that occur when the observing direction is changed and the luminance in the front direction or the direction near the front direction are in a trade-off relation with respect to the ratio of the distal surface DS1 and the distal surface DS2. Therefore, an optimum condition only has to be selected for the ratio of the distal surface DS1 and the distal surface DS2 by efficiently using an optical simulation or the like according to performance required of a product to which the present invention is applied and the refractive index and the wavelength dispersion of the transparent bodies forming the substrate 52 and the prism 51 in the prism sheet 50.

Specifically, when the distal surfaces on the side relatively far from the light source viewed from the ridgeline of the prism are formed by two different inclination angles, if a ratio of an occupied area of one distal surface is 10 to 30%, the balance of the suppression of the changes in colors that occur when the observing direction is changed and the increase in the luminance in the front direction or the direction near the front direction is maintained. More desirable, by setting the ratio of an occupied area of the one distal surface to 20 to 25%, both of the suppression of the changes in colors that occur when the observing direction is changed and the increase in the luminance in the front direction or the direction near the front direction can be realized at a high level.

When the shape of the prism 51 is formed as explained above, if the refractive index of the prism sheet 50 is set to 1.6, when the lights emitted from the light guide 20 (an angle at which the luminance of emitted lights is maximized is about 78°) pass the prism sheet 50, the lights are subject to the act of the prism sheet 50 and are refracted to the front direction or the direction near the front direction. The lights travel in the front direction or the direction near the front direction in which an angle at which the luminance is maximized is equal to or smaller than 10°.

Most of the lights emitted from the light guide 20 and entering on the prism sheet 50 enter on the distal surface DS1 and the distal surface DS2. The inclination angles of the distal surfaces DS1 and DS2 are different by about 5 degrees. Therefore, the lights passing through the prism sheet 50 and traveling in the same direction change to light in which the lights refracted on the prism at different refraction angles are mixed. In this case, because of the wavelength dependency of the refractive index of the transparent body forming the prism sheet 50, a part of changes in colors that occur in the refraction of the lights are averaged. Therefore, it is possible to suppress the changes in colors that occur when the observing direction is changed.

As explained above, it is desirable to use, as the prism sheet 50, the transparent and optically isotropic transparent body or the transparent body that does not cause a phase difference harmful for the p-polarized light passing through the prism sheet 50. This is for suppressing the problem in that a change occurs in the p-polarized light emitted from the light guide 20 and passing the prism sheet 50 and the p-polarized light components are lost and for emitting lights having a large ratio of the p-polarized light components from the prism sheet 50. In this case, since the lights emitted from the light guide 20 include a large amount of p-polarized light components, in the lights after passing through the prism sheet 50, with the contribution of the p-polarized light components, the polarization degree ρp of the p-polarized light is about 30%. Therefore, illumination light having a high polarization degree can be obtained.

In the lighting device 100 according to the present invention, as shown in FIGS. 1 and 5, the diffusion sheet 60 may be arranged on the prism sheet 50 viewed from the light guide 20 according to necessity. The diffusion sheet 60 has a function of diffusing light emitted from the prism sheet 50 to expand the distribution of emission angles or improving in-plane uniformity of luminance. As the diffusion sheet 60, it is possible to use, for example, a sheet obtained by forming unevenness on the surface of a transparent polymeric film of PET (polyethylene terephthalate), PC (polycarbonate), or the like, a film obtained by forming, on the surface of a polymeric film, a diffusion layer in which translucent particulates having a refractive index different from that of a transparent medium are mixed in the transparent medium, a sheet imparted with diffusibility by mixing air bubbles on the inside of a plate or a film, or a film obtained by scattering white pigment in a transparent member such as acrylic resin. Since a prism forming surface of the prism sheet 50 tends to be scratched, the diffusion sheet 60 may be caused to function as a protective layer for the prism sheet 50.

When a film having optical anisotropy such as a PET film or a PC film is used as the diffusion sheet 60, in order to realize illumination light having a large light amount of predetermined linearly polarized light components, it is important to maintain a state of p-polarized light emitted from the prism sheet 50 by setting the direction of a slow axis of the diffusion sheet 60 to a direction in which the azimuth angle θ is 0 degree or 90 degrees.

The directivity of light passing through the diffusion sheet 60 may be changed by forming a micro lens on the surface of the diffusion sheet 60. Further, the directivity of the light passing through the diffusion sheet 60 may be changed by forming a fine structure on the surface and making use of a refraction effect.

Second Embodiment

Figure 8:
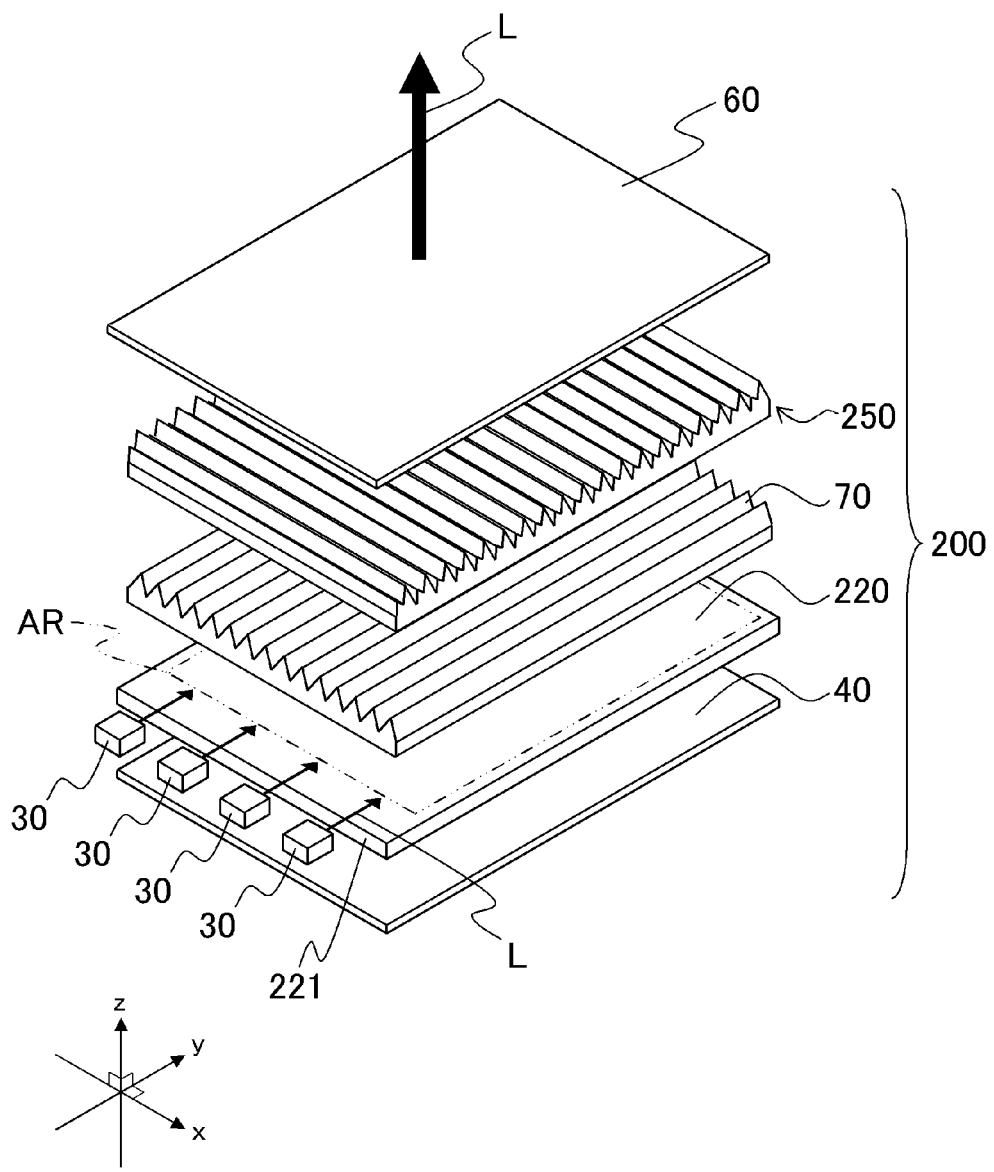
FIG. 8 is a schematic perspective view showing a schematic configuration of a main part in a lighting device according to a second embodiment of the present invention.

FIG. 8 is a schematic perspective view showing a schematic configuration of a main part in a lighting device 200 according to a second embodiment of the present invention. In the lighting device 100 explained in the first embodiment, one prism sheet is used. On the other hand, in an example of a configuration explained in the second embodiment, two prism sheets are used. In the example explained in the second embodiment, a part of the structure of the light guide is changed. Since the other components are basically the same as the components in the first embodiment, detailed explanation of the components is omitted. In the following explanation, the coordinate system, the azimuth angle, and the polar angles used in the explanation of the first embodiment (FIGS. 1 and 2, etc.) are used. Specifically, an x-axis direction, a y-axis direction, and a z axis direction in an xyz coordinate system shown in FIG. 8 are respectively the same as the x-axis direction, the y-axis direction, and the z axis direction in the xyz coordinate system shown in FIG. 1.

As shown in FIG. 8, the lighting device 200 according to the second embodiment includes a light guide 220, the plural light sources 30, the reflection sheet 40, a prism sheet 250, and the prism sheet 70 and may include the diffusion sheet 60 according to necessity.

The prism sheet 250 and the prism sheet 70 arranged on a planar light emission surface side of the light guide 220 are optical sheets having a function of changing a traveling direction of light emitted from the planar light emission surface (a region AR) of the light guide 220. Both the prism sheets 250 and 70 include a prism row including plural prisms. As shown in FIG. 8, the direction of ridgelines of the prisms included in the prism sheet 250 extends in a direction parallel to a longitudinal direction of a light source light incident surface 221, near which the light source 30 is arranged, of the light guide 220. In other words, the ridgeline direction of the prisms is substantially parallel to the x axis. On the other hand, the direction of ridgelines of the prisms of the prism sheet 70 arranged between the prism sheet 250 and the light guide 220 extends in a direction orthogonal to the ridgeline direction of the prisms of the prism sheet 250. In other words, the direction of the ridgelines of the prisms of the prism sheet 70 extends in a direction (the y-axis direction) orthogonal to the longitudinal direction of the light source light incident surface 221, near which the light source 30 is arranged, of the light guide 220.

As the prism sheet 70, a prism sheet in which the cross-sectional shape of prisms is an isosceles triangle having a vertical angle of 90° and a base angle of 45° is used. Since the prism sheet 70 is widely and commonly used, explanation of the prism sheet 70 is omitted. The prism sheet 250 is a most important member in the present invention. Details of the prism sheet 250 are explained below.

The light guide 220 has a function of emitting, while guiding the light L emitted from the light source 30 and entering from one light source light incident surface 221, a part of the light L from the planar light emission surface 222 to convert the light L into a planar shape as explained in the first embodiment. The light guide 220 is formed of a substantially rectangular planar member transparent to visible light and includes a light extraction structure 223 for emitting, from the planar light emission surface 222, the lights L entering from the light source light incident surface 221 and guided in the light guide 220.

Figure 9:
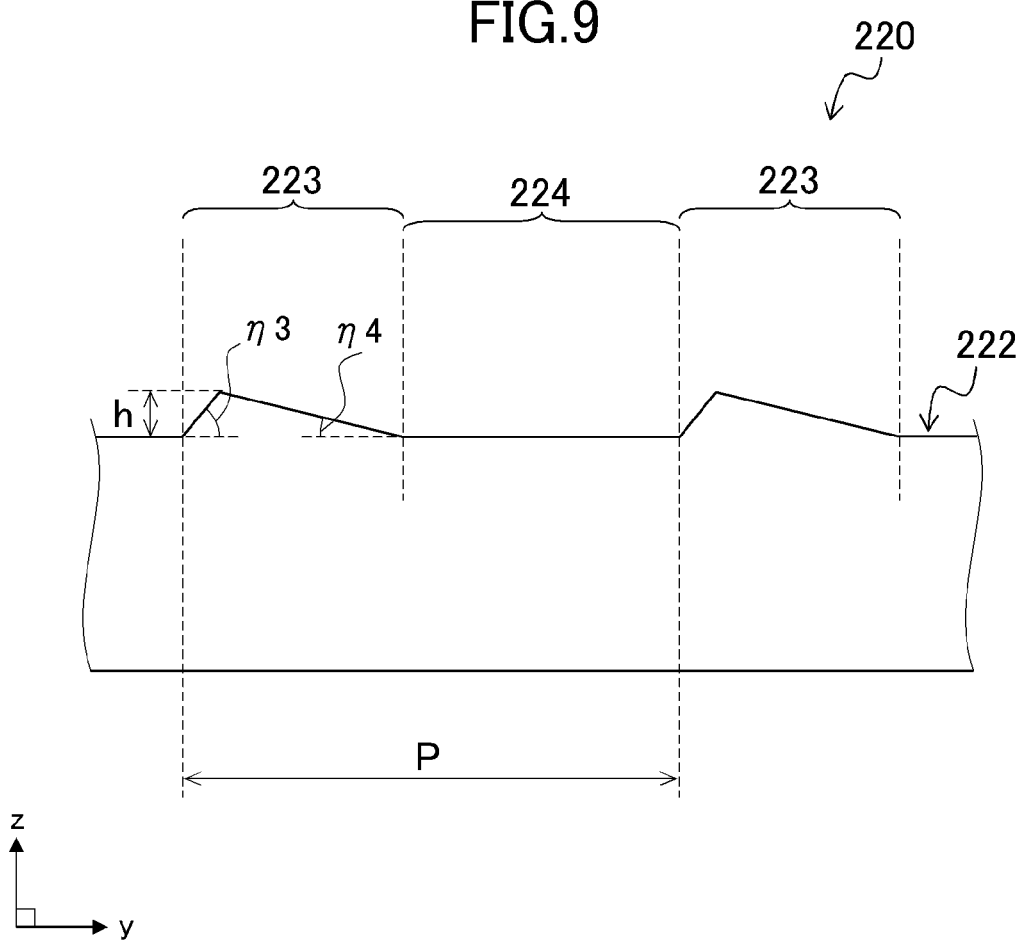
FIG. 9 is a schematic side sectional view for explaining the shape of a light extraction structure in a light guide according to the second embodiment.

In the second embodiment, as an example of the light extraction structure 223, as shown in FIG. 9, a V-shaped structure provided in the planar light emission surface 222 of the light guide 220 is explained. FIG. 9 is a schematic side sectional view for explaining the shape of the light extraction structure 223 in the light guide 220. In FIG. 9, a cross-sectional configuration viewed on a cross section parallel to the yz plane in the xyz coordinate system shown in FIG. 8, i.e., a cross section parallel to a main traveling direction of light guided in the light guide 220 is shown. A ridgeline of the V-shaped structure forming the light extraction structure 223 extends in a direction in which the azimuth angle θ is about 0 degree. A region 224 present between two light extraction structures 223 adjacent to each other is a flat surface substantially parallel to a plane formed by the planar light emission surface 222 of the light guide 220.

In this case, the light source 30 is arranged on the left side of the light guide 220. An angle η3 of an inclined surface near from the light source 30 of two inclined surfaces and an angle η4 of an inclined surface far from the light source 30 are different. The angle η3 is larger. The angles η3 and η4 of the inclined surfaces are respectively inclination angles with respect to a surface parallel to the plane formed by the planar light emission surface 222 of the light guide 220.

The light guide 220 in the lighting device 200 according to the second embodiment is configured such that a direction in which an index value (e.g., luminance or luminous intensity) concerning an amount of light emitted from the planar light emission surface 222 side of the light guide 220 is maximized is a direction shifting from the perpendicular direction of the planar light emission surface 222 of the light guide 220 in a direction in which the azimuth angle θ is about 90 degrees.

In the lighting device according to the present invention, the light guide 220 is configured such that an index value of the light emitted from the planar light emission surface 222 of the light guide 220 is maximized in a direction in which the azimuth angle θ is about 90 degrees and the emission angle α is 65 degrees to 85 degrees. Such a light guide 220 can be realized by, for example, setting the angle η4 of the inclined surface forming the light extraction structure 223 to about 0.5 degree to 15 degrees. On the other hand, as the angle η3 of the inclined surface forming the light extraction structure 223, an angle at which a loss of the light guided in the light guide 220 is small only has to be selected. Specifically, an appropriate angle only has to be selected from a range of 20 degrees to 90 degrees.

For example, when polycarbonate is used as the material of the light guide 220, it is possible to efficiently extract light from the light guide 220 by setting η4 to about 5° and setting η3 to about 40°. The array pitch P and the size (height) h of the light extraction structure 223 only have to be set such that lights emitted from the light guide 220 are substantially uniform in a plane of the planar light emission surface 222. For example, it is realistic to select the pitch P from a range of several ten micrometers to hundred and several ten micrometers and select the height h from a range of several micrometers to several hundred micrometers. The pitch P and the height h may be appropriately changed according to the position of the light guide 220.

Figure 10:
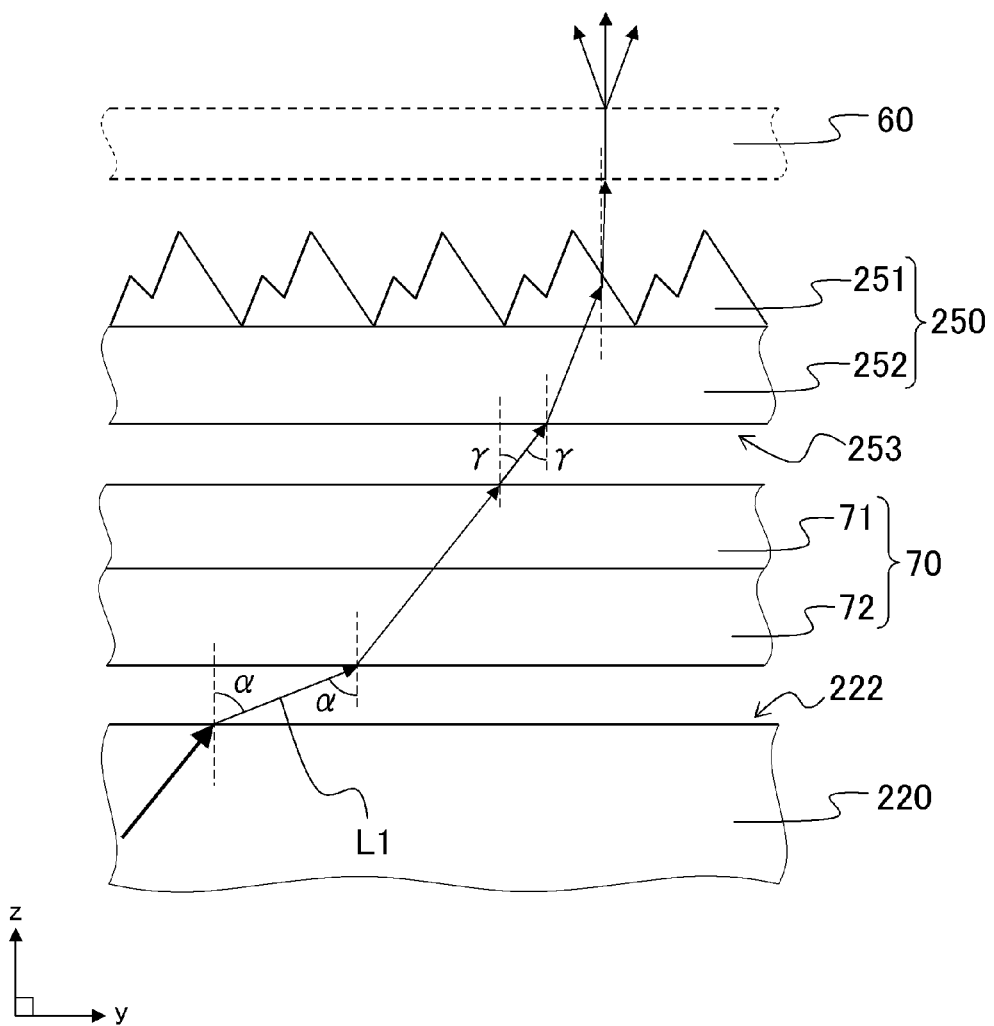
FIG. 10 is a schematic sectional view showing an example of a schematic configuration of a prism sheet in the lighting device according to the second embodiment.

The structure of the prism sheet 250 according to the present invention is explained in detail. FIG. 10 is a schematic sectional view showing an example of a schematic configuration of the prism sheet in the lighting device according to the second embodiment of the present invention. A cross-sectional configuration viewed on the cross section parallel to the yz plane in the xyz coordinate system shown in FIG. 8, i.e., the cross section parallel to the main traveling direction (the y-axis direction) of the light guided in the light guide 220 is shown.

The prism sheet 250 is basically configured according to the same idea as the prism sheet 50 explained in the first embodiment. However, the second embodiment is different from the first embodiment in that a substrate 72 and another prism sheet 70 formed by a prism 71 are arranged between the prism sheet 250 and the light guide 220 and different in a state of light entering on the prism sheet 250. Specifically, in the first embodiment, the light L emitted from the light guide 220 at the emission angle α enters on the prism sheet 250 as the angle α. However, in the second embodiment, the light L emitted from the light guide 220 at the emission angle α is subject to the action of the prism sheet 70 and enters on the prism sheet 250 at an angle γ smaller than the angle α. Therefore, in the prism sheet 250 according to the second embodiment, the cross-sectional shape of the prism is changed.

As the prism sheet 250 according to the second embodiment, when industrial usefulness such as productivity is taken into account, as illustrated in FIG. 10, it is realistic to use a prism sheet in which a transparent film, the rear surface of which is a planar light incident surface 253, is a substrate 252 and prisms 251 are formed on the surface of the substrate 252 in a row. However, the present invention specifies the cross-sectional shape of a prism and does not specify the structure and a manufacturing method of the prism. For example, a substrate section and a prism section may be indivisible integrally molded sections.

When the prism sheet in which the transparent film is the substrate 252 and the prisms 251 are formed on the surface of the substrate 252 in a row is used as the prism sheet 250, in the prism sheet 50 according to the first embodiment, in order to maintain and effectively utilize a polarization state of light having a large ratio of p-polarized light components emitted from the light guide 20, it is desirable to use, as the substrate 252, a transparent body in which a phase difference does not occur in p-polarized light components. On the other hand, in the prism sheet 250 according to the second embodiment, a transparent body in which a polarization state of light passing through the prism sheet 250 changes may be used as the substrate 252.

This is because, in the lighting device 100 according to the second embodiment, the prism sheet 70 is arranged between the prism sheet 250 and the light guide 220 and a polarization state of light emitted from the light guide 220 is changed by the prism sheet 70 and is not particularly maintained.

Figure 11:
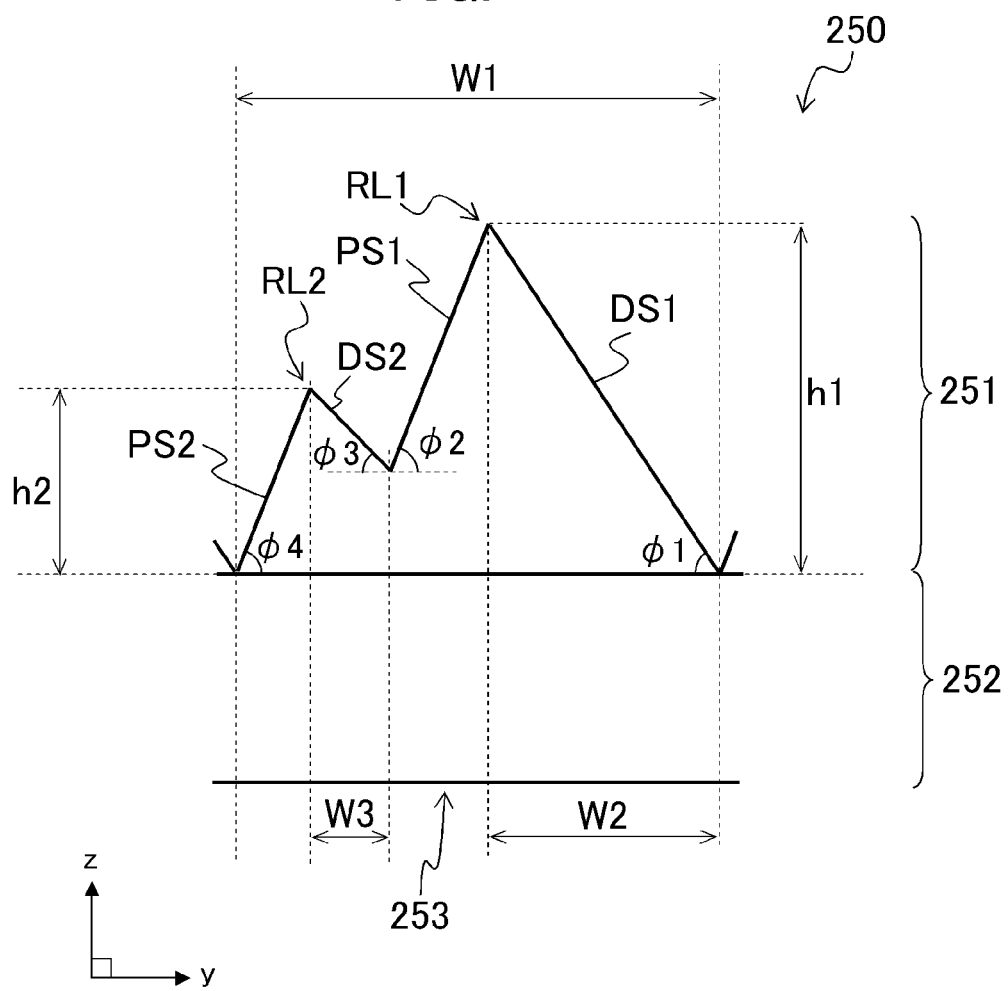
FIG. 11 is a schematic sectional view showing an example of the cross-sectional shape of a prism in the prism sheet according to the second embodiment.

FIG. 11 is a schematic sectional view showing an example of the cross-sectional shape of the prism in the prism sheet. The prism 251 section in the prism sheet 250 shown in FIG. 10 is shown in enlargement. The prism sheet in the lighting device according to the present invention is characterized in that, in the cross-sectional shape of a prism of a prism row formed on the front surface side of the prism sheet, a distal surface on a side relatively far from a light source viewed from a ridgeline of the prism includes at least two kinds of inclination angles. Therefore, the prism sheet 250 according to this embodiment also has this characteristic.

However, in the second embodiment, the characteristic is realized by, rather than the cross-sectional shape in which two triangles are arranged side by side as in the first embodiment, a cross-sectional shape in which a part of two triangles are superimposed each other.

The prism sheet of the lighting device 200 according to the present invention is characterized in that, more desirably, in the cross-sectional shape of the prism, an inclination angle of an inclined surface on a side relatively close to the light source viewed from the ridgeline of the prism substantially coincides with an inclination angle of one of the two inclined surfaces on the side far from the light source. In this embodiment, this characteristic is not adopted in order to give higher priority to the level of luminance in the front direction of light emitted from the lighting device 200 or the direction near the front direction than the reflectance of the lighting device. This is because, when the inclination angle of the inclined surface on the side relatively close to the light source viewed from the ridgeline of the prism is caused to coincide with the inclination angle of the inclined surface on the side far from the light source, depending on states of the light guide 220 and the prism sheet 70, a part of the light entering on the prism sheet 250 also enters on the inclined surface on the side relatively close to the light source and refracted or reflected to scatter in directions other than the front direction or the direction near the front direction. As a result, the luminance in the front direction or the direction near the front direction decreases.

Therefore, in the second embodiment, in particular, the inclination angle of the inclined surface on the side relatively close to the light source is set larger than the inclination angle of the inclined surface on the side far from the light source. In this case, in the light entering on the prism sheet 250, a ratio of the light entering on the inclined surface on the side relatively close to the light source decreases. Therefore, the luminance in the front direction or the direction near the front direction can be increased.

The prism 251 in the prism sheet 250 according to the second embodiment includes the two ridgelines RL1 and RL2. The inclination angles $\phi1$ and $\phi3$ of the distal surface DS1 and the distal surface DS2 on the side relatively far from the light source 30 viewed from the respective ridgelines are set different from each other.

Both the distal surfaces DS1 and DS2 forming the cross-sectional shape of the prism 251 have a function of refracting, when light having an angle at which luminance or luminous intensity is maximized among lights emitted from the light guide enters on the prism sheet, the light to the front direction or the direction (the +z direction) near the front direction and include inclination angles for the function.

On the other hand, the inclination angles $\phi2$ and $\phi4$ of the proximal surfaces PS1 and PS2 on the side relatively close to the light source 30 viewed from the two ridgelines RL1 and RL2 forming the prism 251 are angles larger than both the inclination angles $\phi1$ and $\phi3$. In other words, a relation $\phi2>\phi1$, $\phi2>\phi3$, $\phi4>\phi1$, and $\phi4>\phi3$ is satisfied. The inclination angles are inclination angles at which, when light having an angle at which luminance or luminous intensity is maximized among lights passing through the prism sheet 70 enters on the prism sheet 250, the light does not directly enter.

The action of the prism sheet 250 is explained. Most of lights emitted from the light guide 220, passing through the prism sheet 70, and entering on the prism sheet 250 enter on the distal surfaces DS1 and DS2 without entering on the proximal surfaces PS1 and PS2. The lights entering on the distal surfaces DS1 and DS2 are refracted on the interface with the air and travel in the front direction or the direction (the +z direction in the figure) near the front direction.

In this case, the light passing through the distal surface DS1 and the light passing through the distal surface DS2 have different inclination angles of the respective inclined surfaces. Therefore, even lights traveling in the same direction after passing through the prism sheet 250 have different refraction angles on the prism if the lights pass through different inclined surfaces. Therefore, an effect is obtained that changes in colors due to an observing direction are suppressed.

An optimum range is present for a difference $\Delta\phi$ ($=|\phi1-\phi3|$) between the inclination angles of the inclined surfaces on the side relatively far from the light source viewed from the ridgeline of the prism. This condition is the same as that in the first embodiment. Specifically, in the cross-sectional shape of the prism 251 forming the prism sheet 250, the difference $\Delta\phi$ between the inclination angles needs to satisfy the following relation:

$$4°\leq\Delta\phi\leq20°$$

In order to suppress the changes in colors due to a difference in the observing direction and increase the luminance in the front direction or the direction near the front direction, the difference $\Delta\phi$ between the inclination angles more desirably satisfies the following relation:

$$5°\leq\Delta\phi\leq15°$$

On the other hand, the inclination angles $\phi2$ and $\phi4$ of the proximal surfaces PS1 and PS2 on the side relatively close to the light source 30 viewed from the two ridgelines RL1 and RL2 forming the prism 251 are set to angles larger than both the inclination angles $\phi1$ and $\phi3$. In other words, the relation $\phi2>\phi1$, $\phi2>\phi3$, $\phi4>\phi1$, and $\phi4>\phi3$ is satisfied. Consequently, the luminance of light itself emitted from the lighting device increases.

In the prism sheet 250 according to the second embodiment, as in the prism sheet 50 according to the first embodiment, light passing through the prism sheet 250 is refracted on the interface with the air in two places of the rear surface and the front surface of the prism sheet 250. Since the transmittance of p-polarized light components is higher than the transmittance of s-polarized light components in this refraction, a light amount of the p-polarized light components of the light passing through the prism sheet 250 increases. Therefore, it is possible to obtain illumination light having a large light amount of predetermined linearly polarized light components (the p-polarized light components).

A pitch (entire width W1) of the prism row and height h1 of the prism 251 are practically about several ten micrometers. Specific dimensions and inclination angles of the prism 251 only have to be selected by effectively using an optical simulation or the like according to the refractive index of the transparent bodies forming the substrate 252 and the prism 251 in the prism sheet 250.

An example of the dimensions and the inclination angles of the prism 251 are as explained below. First, the entire width W1 in the prism 251 is set to 35 μm, the height h1 is set to about 26.7 μm, the inclination angle $\phi1$ of the distal surface DS1 is set to 57.7°, the inclination angle $\phi2$ the proximal surface PS1 is set to 69.1°, the inclination angle $\phi3$ of the distal surface DS2 is set to 47.6°, and the inclination angle $\phi4$ of the proximal surface PS2 is set to 69.1°. In this case, the difference $\Delta\phi$ between the inclination angles is 10.1° and satisfies the conditions explained above. The width (the width of projection on the y axis) W2 in the xy plane corresponding to the distal surface DS1 is set to 16.9 μm and the width (the width of projection on the y axis) W3 in the xy plane corresponding to the distal surface DS2 is set to 5.6 μm. The height (the height of projection on the z axis) h2 of the proximal surface PS2 is 13.9 μm.

A ratio of the distal surface DS1 and the distal surface DS2 is equivalent to a ratio of the width W2 and the width W3 in which the respective inclined surfaces are included. In this embodiment, W2:W3=about 3:1 (a ratio of W3 in the width of projection of all the distal surfaces on the y axis is about 25%). When the ratio of W2 is increased, the luminance in the front direction or the direction near the front direction increases. However, the changes in colors that occur when the observing direction is changed increase. On the other hand, when the ratio of W2 is reduced, the changes in colors that occur when the observing direction is changed decrease. However, the luminance in the front direction or the direction near the front direction decreases. In other words, the changes in colors that occur when the observing direction is changed and the luminance in the front direction or the direction near the front direction are in a trade-off relation with respect to the ratio of the distal surface DS1 and the distal surface DS2. Therefore, an optimum condition only has to be selected for the ratio of the distal surface DS1 and the distal surface DS2 by efficiently using an optical simulation or the like according to performance required of a product to which the present invention is applied and the refractive index and the wavelength dispersion of the transparent bodies forming the substrate 252 and the prism 251 in the prism sheet 250.

Specifically, when the inclined surfaces on the side relatively far from the light source viewed from the ridgeline of the prism are formed by two different inclination angles, if a ratio of an occupied area of one inclined surface is 10 to 30%, the balance of the suppression of the changes in colors that occur when the observing direction is changed and the increase in the luminance in the front direction or the direction near the front direction is maintained. More desirable, by setting the ratio of an occupied area of the one inclined surface to 20 to 25%, both of the suppression of the changes in colors that occur when the observing direction is changed and the increase in the luminance in the front direction or the direction near the front direction can be realized at a high level. When the shape of the prism 251 is formed as explained above, if the refractive index of the prism sheet 250 is set to 1.6 and the refractive index of the prism sheet 70 is set to 1.65, the light after passing through the prism sheet 250 travels in the front direction or the direction near the front direction in which an angle at which luminance is maximized is equal to or smaller than 10°.

Most of the lights emitted from the light guide 220 and entering on the prism sheet 250 enter on the distal surface DS1 and the distal surface DS2. The inclination angles of the distal surfaces DS1 and DS2 are different by about 10 degrees. Therefore, the lights passing through the prism sheet 250 and traveling in the same direction change to light in which the lights refracted on the prism 251 at different refraction angles are mixed. In this case, because of the wavelength dependency of the refractive index of the transparent body forming the prism sheet 250, a part of changes in colors that occur in the refraction of the lights are averaged. Therefore, it is possible to suppress the changes in colors that occur when the observing direction is changed.

In the lights passing through the prism sheet 250, according to the polarization dependency of the reflectance in the refraction on the front surface and the rear surface of the prism sheet 250, the polarization degree ρp of the p-polarized light is about 20%. Therefore, illumination light having a high polarization degree can be obtained.

As a design idea different from this embodiment, when realization of both of the high luminance in the front direction or the direction near the front direction and the high reflectance of the lighting device is taken into account, in the cross-sectional shape of the prism 251 forming the prism sheet 250, an angle represented in a range of 0° to 90° formed with a planar light incident surface by a surface (a proximal surface) on a side relatively close to a light source viewed from a ridgeline of a prism is desirably in a range of an angle equal to or larger than 0° and equal to or smaller than 10° with respect to an angle represented in a range of 0° to 90° formed with the planar light incident surface by a distal surface having a highest ratio of an occupied area when projected on the planar light incident surface among plural distal surfaces. When an inclination angle of the proximal surface is set to this condition, the luminance in the front direction or the direction near the front direction is inferior to that in the second embodiment. However, the reflectance of the lighting device is higher than that in the second embodiment. In this case, the luminance of the lighting device alone is low. However, if a display panel having high rear surface reflectance is used, high luminance can be obtained in the entire display device according to a recycle effect of light reflected on the rear surface of the display panel.

Third Embodiment

Figure 12:
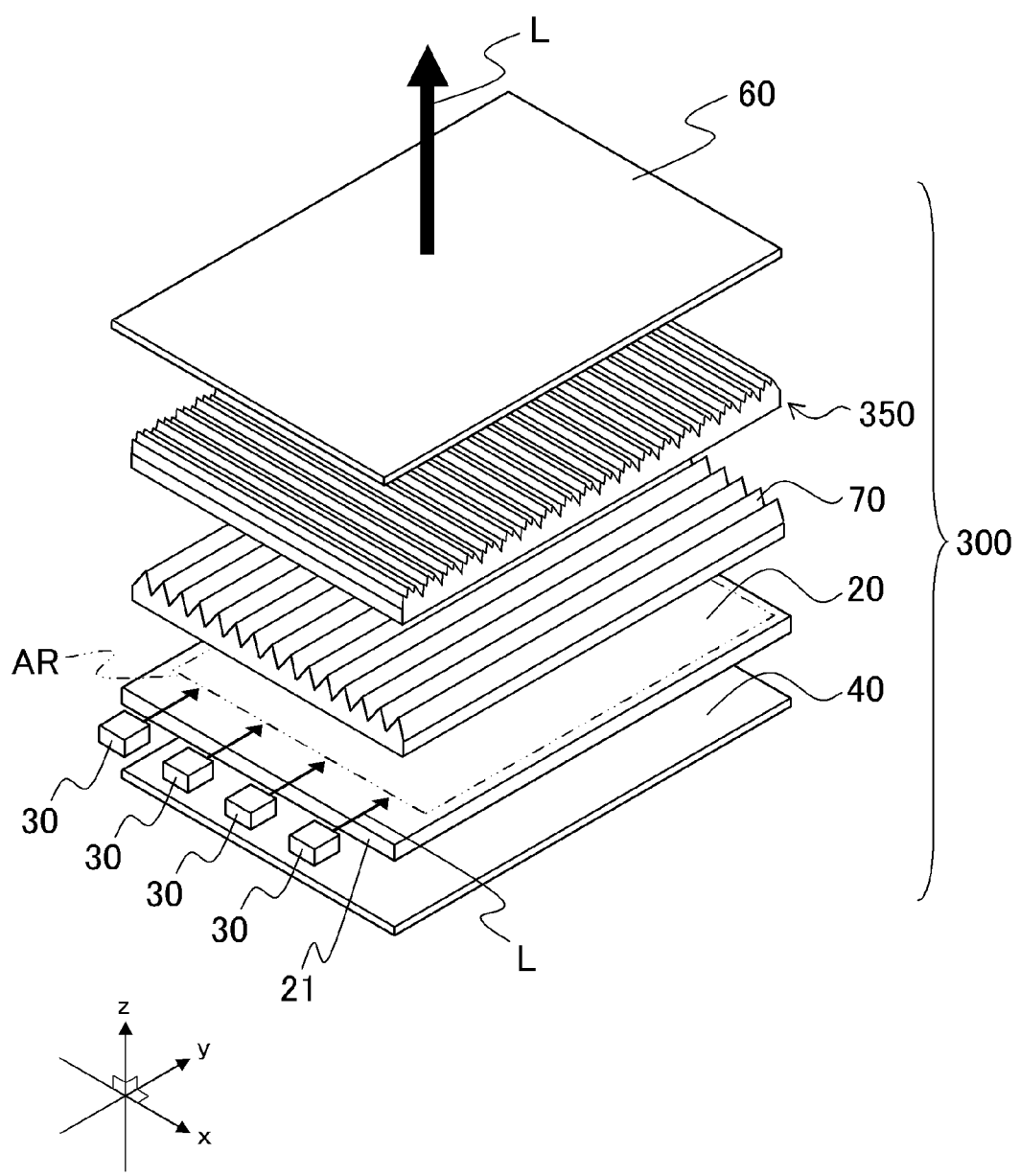
FIG. 12 is a schematic perspective view showing a schematic configuration of a main part in a lighting device according to a third embodiment of the present invention.

FIG. 12 is a schematic perspective view showing a schematic configuration of a main part in a lighting device according to a third embodiment of the present invention. In the third embodiment, the cross-sectional shape of the prism of the prism sheet 250 is changed in the lighting device 200 according to the second embodiment. Since the other components are basically the same as those in the second embodiment, detailed explanation of the components is omitted. As shown in FIG. 12, a lighting device 300 according to the third embodiment includes the light guide 20, the plural light sources 30, the reflection sheet 40, a prism sheet 350, and the prism sheet 70 and may include the diffusion sheet 60 according to necessity.

The prism sheet 350 and the prism sheet 70 arranged on a planar light emission surface side of the light guide 20 are optical sheets having a function of changing a traveling direction of light emitted from the planar light emission surface (a region AR) of the light guide 20. Both the prism sheets 350 and 70 include a prism row including plural prisms. As shown in FIG. 12, the direction of ridgelines of the prisms included in the prism sheet 350 extends in a direction parallel to a longitudinal direction of the light source light incident surface 21, near which the light source 30 is arranged, of the light guide 20. In other words, the ridgeline direction of the prisms is substantially parallel to the x-axis direction. On the other hand, the direction of ridgelines of the prisms of the prism sheet 70 arranged between the prism sheet 350 and the light guide 20 extends in a direction orthogonal to the ridgeline direction of the prisms of the prism sheet 350. In other words, the direction of the ridgelines of the prisms of the prism sheet 70 extends in a direction (the y-axis direction) orthogonal to the longitudinal direction of the light source light incident surface 21, near which the light source 30 is arranged, of the light guide 20.

As the prism sheet 70, a prism sheet in which the cross-sectional shape of prisms is an isosceles triangle having a vertical angle of 90° and a base angle of 45° is used. Since the prism sheet 70 is widely and commonly used, explanation of the prism sheet 70 is omitted.

Figure 13:
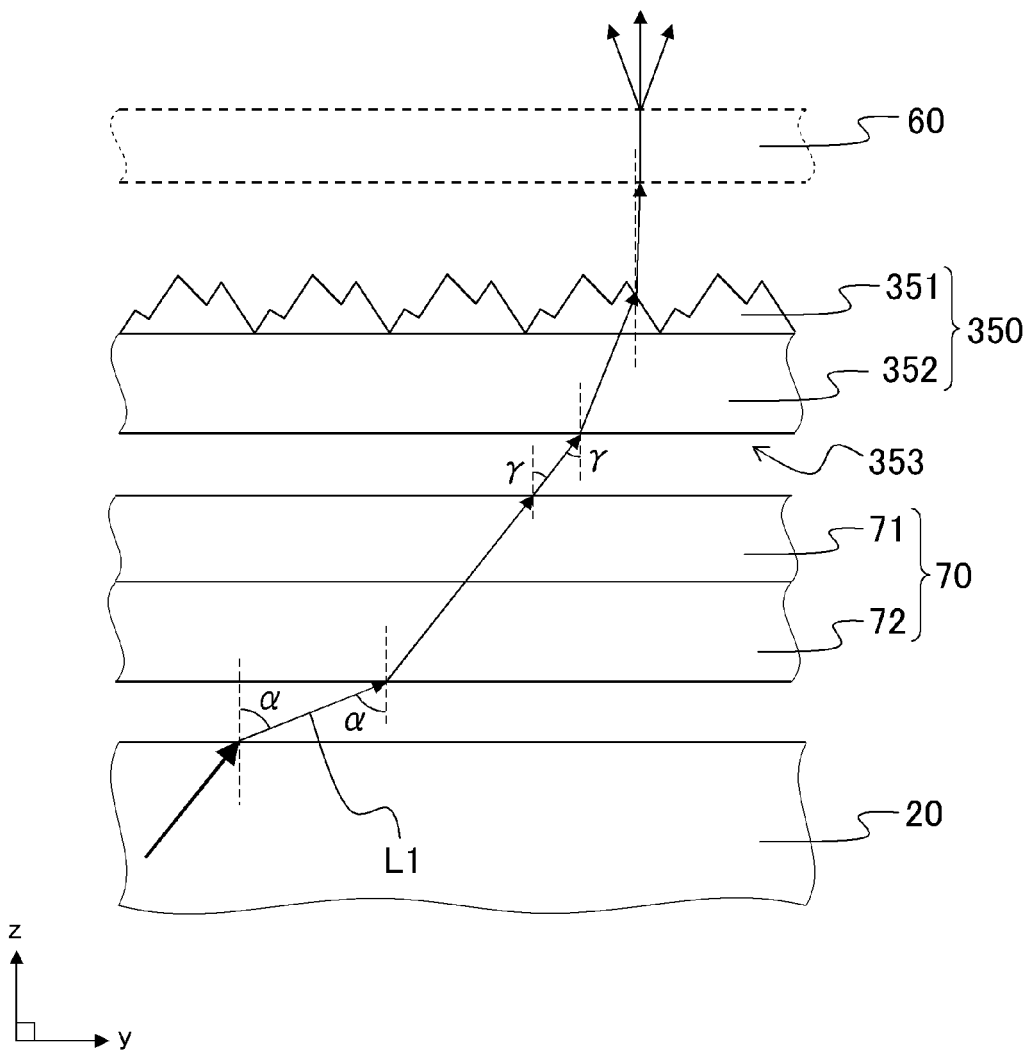
FIG. 13 is a schematic sectional view showing an example of a schematic configuration of a prism sheet in the lighting device according to the third embodiment.

The structure of the prism sheet 350 according to the present invention is explained in detail. FIG. 13 is a schematic sectional view showing an example of a schematic configuration of the prism sheet in the lighting device according to the third embodiment of the present invention. A cross-sectional configuration viewed on the cross section parallel to the yz plane in the xyz coordinate system shown in FIG. 12, i.e., the cross section parallel to the main traveling direction (the y-axis direction) of the light guided in the light guide 20 is shown.

The prism sheet 350 is basically configured according to the same idea as the prism sheet 50 explained in the first embodiment. However, although the light L emitted from the light guide 20 at the emission angle α enters on the prism sheet 50 at the angle α in the first embodiment, in the third embodiment, the light L emitted from the light guide 20 at the emission angle α is subject to the action of the prism sheet 70 and entering on the prism sheet 350 at the angle γ smaller than the angle α. Therefore, in the prism sheet 350 according to the third embodiment, the cross-sectional shape of the prism is formed different from that in the first embodiment.

As the prism sheet 350 according to the third embodiment, when industrial usefulness such as productivity is taken into account, as illustrated in FIG. 13, it is realistic to use a prism sheet in which a transparent film having a planar light incident surface 353 is a substrate 352 and prisms 351 are formed on the surface of the substrate 352 in a row. However, the present invention specifies the cross-sectional shape of a prism and does not specify the structure and a manufacturing method of the prism. For example, a substrate section and a prism section may be indivisible integrally molded sections.

Figure 14:
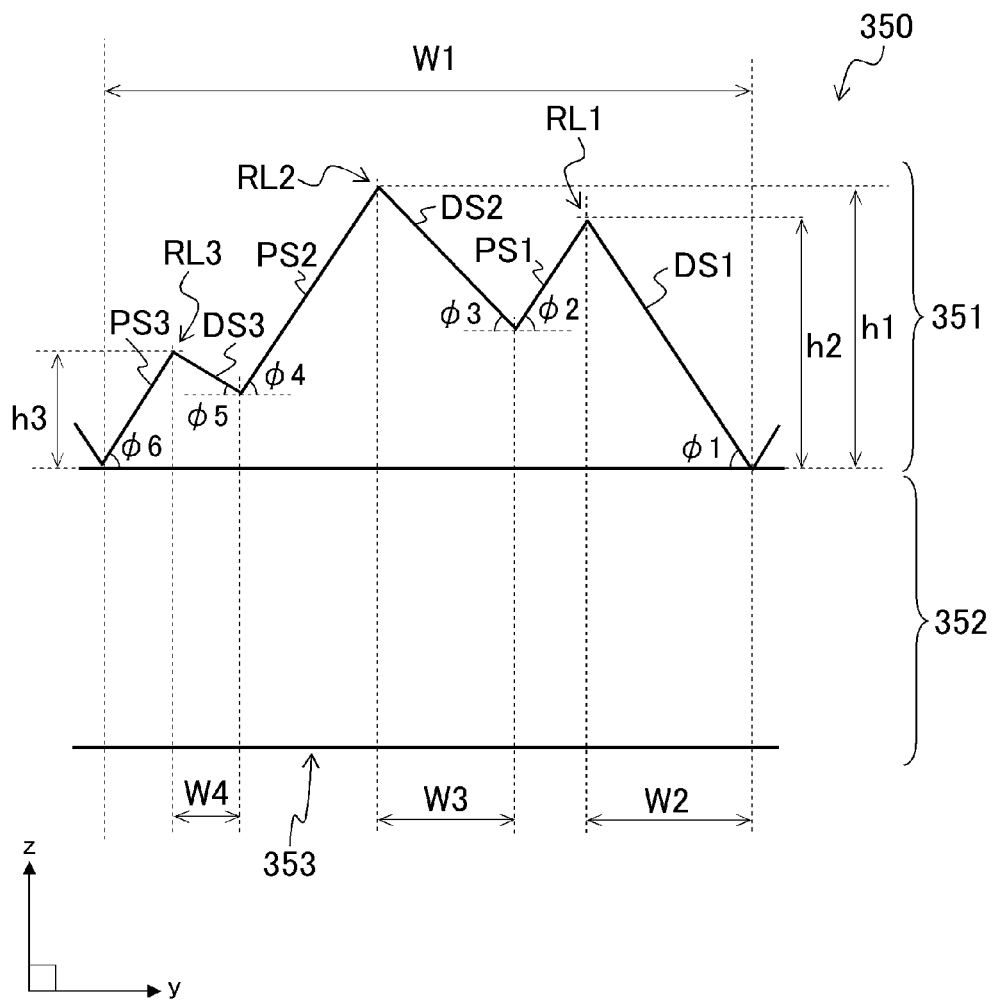
FIG. 14 is a schematic sectional view showing an example of the cross-sectional shape of a prism in the prism sheet according to the third embodiment.

FIG. 14 is a schematic sectional view showing an example of the cross-sectional shape of the prism in the prism sheet 350. The prism 351 section in the prism sheet 350 shown in FIG. 13 is shown in enlargement. The prism sheet in the lighting device according to the present invention is characterized in that, in the cross-sectional shape of a prism forming a prism row formed on the front surface side of the prism sheet, an inclined surface on a side relatively far from a light source viewed from a ridgeline of the prism includes at least two kinds of inclination angles. Therefore, the prism sheet 350 according to this embodiment also has this characteristic.

The prism sheet of the lighting device according to the present invention is characterized in that, more desirably, in the cross-sectional shape of the prism, an inclination angle of an inclined surface on a side relatively close to the light source viewed from the ridgeline of the prism substantially coincides with an inclination angle of one of the inclined surfaces on the side far from the light source. This embodiment also has this characteristic. Specifically, all the inclination angles of the inclined surface on the side relatively close to the light source viewed from the ridgeline of the prism are caused to coincide with an inclination angle of an inclined surface having a largest area ratio among the inclined surfaces on the side relatively far from the light source.

This is for increasing the reflectance of the lighting device. When the lighting device is used as a backlight of a display device, if the reflectance of the backlight is high, a ratio of light returning from a display panel side to the backlight side being reused increases and the luminance in the front direction of the display device can be increased.

The shape of the prism of the prism sheet arranged in a position close to the display panel relates to the reflectance in the front direction of the lighting device (the backlight). Basically, the reflectance can be increased by setting, in the cross-sectional shape of the prism, an inclination angle of the inclined surface (a proximal surface) on the side relatively close to the light source viewed from the ridgeline of the prism to a value same as an inclination angle of an inclined surface (a distal surface) on the side relatively far from the light source (the direction of the inclination is opposite).

In other words, when a perpendicular drawn from the ridgeline of the prism to the planar light emission surface is assumed, it is desirable that the cross-sectional shape of the prism is in a symmetrical relation with respect to this line.

This is because, when light entering from the front surface side (the opposite side of the light guide) of the prism sheet is reflected on the rear surface of the prism sheet or the like and travels to the front surface side of the prism sheet again, for example, light entering from a surface on the side relatively close to the light source viewed from the ridgeline of the prism tends to be recursively reflected when the light is emitted from a surface on the side relatively far from the light source.

In the prism sheet 350 according to the third embodiment, the cross-sectional shape of the prism 351 having the characteristics explained above is realized by a shape in which parts of three triangles are superimposed one on top of another. Therefore, in the third embodiment, the prism includes plural ridgelines and plural inclined surfaces. In such a case, a ratio of the recursive reflection increases and the reflectance of the lighting device can be increased by causing all inclination angle of proximal surfaces on the side relatively close to the light source viewed from the respective ridgelines of the prism 351 to coincide with an inclination angle of a distal surface having a highest area ratio among distal surfaces on the side relatively far from the light source.

In the display device in which the lighting device having high reflectance is used as the backlight in this way, light reflected on the display panel or the reflective polarizer arranged according to necessity and returning to the backlight side is reflected to the front direction or the direction near the front direction and reused. Therefore, an effect is obtained that a display device having higher luminance in the front direction or the direction near the front direction can be realized.

The prism 351 in the prism sheet 350 according to the third embodiment includes three ridgelines RL1, RL2, and RL3. Inclination angles φ1, φ3, and φ5 of distal surfaces DS1, DS2, and DS3 on a side relatively far from the light source 30 viewed from the respective ridgelines are set different from one another.

All the distal surfaces DS1, DS2, and DS3 forming the cross-sectional shape of the prism 351 have a function of refracting, when light having an angle at which luminance or luminous intensity is maximized among lights emitted from the light guide enters on the prism sheet 350, the light to the front direction or the direction (the +z direction) near the front direction and include inclination angles for the function.

On the other hand, inclination angles φ2, φ4, and φ6 of proximal surfaces PS1, PS2, and PS3 on a side relatively close to the light source 30 viewed from the three ridgelines RL1, RL2, and RL3 forming the prism 351 are caused to coincide with the inclination angle φ1. In other words, a relation φ2=φ4=φ6=φ1 is satisfied. The inclination angle φ1 is an inclination angle of the distal surface DS1 having a largest area ratio among distal surfaces on the side relatively far from the light source viewed from the respective ridgelines of the prism 351.

The action of the prism sheet 350 is explained. Most of lights emitted from the light guide 20, passing through the prism sheet 70, and entering on the prism sheet 350 enter on the distal surfaces DS1, DS2, and DS3. The lights enter on the distal surfaces DS1, DS2, and DS3 are refracted on an interface with the air and travel to the front direction or the direction (the +z direction in the figure) near the front direction.

In this case, light passing through the distal surface DS1, light passing through the distal surface DS2, and light passing through the distal surface DS3 have different inclination angles of the respective distal surfaces. Therefore, even lights traveling in the same direction after passing through the prism sheet 350 have different refraction angles on the prism 351 if the lights pass through different inclined surfaces. In other words, light obtained by averaging the lights having the different refraction angles is observed. Therefore, an effect is obtained that changes in colors due to an observing direction are suppressed.

In the first and second embodiments, the distal surfaces on the side relatively far from the light source viewed from the respective ridgelines of the prism include the two kinds of inclination angles. However, in the third embodiment, the distal surfaces include three kinds of inclination angles. Therefore, in the third embodiment, lights traveling in the same direction after passing through the prism sheet 350 changes to light obtained by averaging lights passed through a large number of refraction angles. Therefore, the suppression effect of changes in colors due to the observing direction is higher.

When lights emitted from the light guide 20 have unevenness of luminance that changes depending on the observing direction, if the prism sheet 350 according to the present invention is used, the lights traveling in the same direction after passing through the prism sheet 350 changes to light obtained by averaging lights passed through plural refraction angles. Therefore, the unevenness of luminance is relaxed. An optimum range is present for a difference between the inclination angles of the distal surfaces on the side relatively far from the light source viewed from the ridgeline of the prism.

In the third embodiment, there are three kinds of inclination angles of the distal surfaces on the side relatively far from the light source viewed from the ridgeline of the prism. In this case, a difference between inclination angles $\Delta\phi13=(|\phi1-\phi3|)$ and a difference between inclination angles $\Delta\phi35=(|\phi3-\phi5|)$ of two distal surfaces having close inclination angles only have to be taken into account. In this case, the optimum range of the difference between the inclination angles is the same as those in the first and second embodiments.

In the cross-sectional shape of the prism 351 forming the prism sheet 350, the differences φ13 and φ35 between the inclination angles need to satisfy the following relation:

$$4°\leq\Delta\phi13\leq20°, 4°\leq\Delta\phi35\leq20°$$

In order to suppress the changes in colors due to a difference in the observing direction and increase the luminance in the front direction or the direction near the front direction, the differences Δφ between the inclination angles more desirably satisfy the following relation:

$$5°\leq\Delta\phi13\leq15°, 5°\leq\Delta\phi35\leq15°$$

On the other hand, the inclination angles φ2, φ4, and φ6 of the proximal surfaces PS1, PS2, and PS3 on the side relatively close to the light source 30 viewed from the three ridgelines RL1, RL2, and RL3 forming the prism 351 are set to be equal to the inclination angle φ1. In other words, the relation φ2=φ4=φ6=φ1 is satisfied. Consequently, the reflectance of the lighting device increases.

In the prism sheet 350 according to the third embodiment, as in the prism sheets 50 and 250 according to the first and second embodiments, light passing through the prism sheet 350 is refracted on the interface with the air in two places of the rear surface and the front surface of the prism sheet 350. Since the transmittance of p-polarized light components is higher than the transmittance of s-polarized light components in this refraction, a light amount of the p-polarized light components of the light passing through the prism sheet 350 increases. Therefore, it is possible to obtain illumination light having a large light amount of predetermined linearly polarized light components (the p-polarized light components).

The pitch (the entire width W1) of the prism row and the height h1 of the prism 351 are practically about several ten micrometers. Specific dimensions and inclination angles of the prism 351 only have to be selected by effectively using an optical simulation or the like according to the refractive index of the transparent bodies forming the substrate 352 and the prism 351 in the prism sheet 350.

An example of the dimensions and the inclination angles of the prism 351 are as explained below. First, the entire width W1 in the prism 351 is set to 35 μm, the height h1 is set to about 16 μm, all the inclination angles φ1 of the distal surface DS1, the inclination angle φ2 the proximal surface PS1, the inclination angle φ4 of the proximal surface PS2, and the inclination angle φ6 of the proximal surface PS3 are set to 57.7°. The inclination angle φ3 of the distal surface DS2 is set to 48° and the inclination angle φ5 of the distal surface DS3 is set to 33°. In this case, the difference Δφ13 between the inclination angles is 9.7° and difference Δφ35 between the inclination angles is 15°, which satisfy the conditions explained above. The width (the width of projection on the y axis) W2 in the xy plane corresponding to the distal surface DS1 is set to 8.75 μm, the width (the width of projection on the y axis) W3 in the xy plane corresponding to the distal surface DS2 is set to 7.37 μm, and width (width of projection on the y axis) W4 in the xy plane corresponding to the distal surface DS3 is set to 3.52 μm. The height (the height of projection on the z axis) h2 of the distal surface DS1 is 13.8 μm and height (height of projection on the z axis) h3 of the proximal surface PS3 is 6.4 μm.

A ratio of the distal surface DS1, the distal surface DS2, and the distal surface DS3 is equivalent to a ratio of the width W2, the width W3, and the width W4 in which the respective distal surfaces are included. In this embodiment, ratios of an occupied area of the distal surface DS1, the distal surface DS2, and the distal surface DS3 are respectively 44.6%, 37.4%, and 18.0%. The distal surface DS1 is the largest. Therefore, all the inclination angles of the proximal surfaces on the side relatively close to the light source viewed from the ridgeline of the prism are caused to coincide with the inclination angle of the distal surface DS1.

In this embodiment, most of the lights emitted from the light guide 20 and entering on the prism sheet 350 after passing through the prism sheet 70 enter on the distal surface DS1, the distal surface DS2, and the distal surface DS3. The inclination angles of the distal surfaces DS1, DS2, and DS3 are different. Therefore, the lights passing through the prism sheet 350 and traveling in the same direction change to light in which the lights refracted on the prism at different refraction angles are mixed. Therefore, because of the wavelength dependency of the refractive index of the transparent body forming the prism sheet 350, changes in colors that occur in the refraction of the lights are averaged. Therefore, it is possible to suppress the changes in colors that occur when the observing direction is changed.

In this embodiment, the inclination angles φ2, φ4, and φ6 of the proximal surfaces PS1, PS2, and PS3 on the side relatively close to the light source 30 viewed from the three ridgelines RL1, RL2, and RL3 forming the prism 351 are caused to coincide with the inclination angle φ1. The inclination angle φ1 is the inclination angle of the distal surface DS1 having the largest area ratio among the distal surfaces on the side relatively far from the light source viewed from the respective ridgelines of the prism 351.

In this case, as explained above, it is possible to increase the reflectance of the lighting device. In the display device in which the lighting device having high reflectance is used as the backlight in this way, light reflected on the display panel or the reflective polarizer arranged according to necessity and returning to the backlight side is reflected to the front direction or the direction near the front direction and reused. Therefore, an effect is obtained that a display device having higher luminance in the front direction or the direction near the front direction can be realized.

As the light passing through the prism sheet 350, it is possible to obtain illumination light having a large amount of p-polarized light components according to the polarization dependency of reflectance in the refraction on the front surface and the rear surface of the prism sheet 350.

If the inclination angles of the distal surfaces on the side relatively far from the light source viewed from the ridgeline of the prism are increased to four or more kinds, it is difficult to increase the luminance in the front direction. Therefore, the inclination angles of the distal surfaces on the side relatively far from the light source viewed from the ridgeline of the prism are desirably two or three kinds.

Fourth Embodiment

Figure 15:
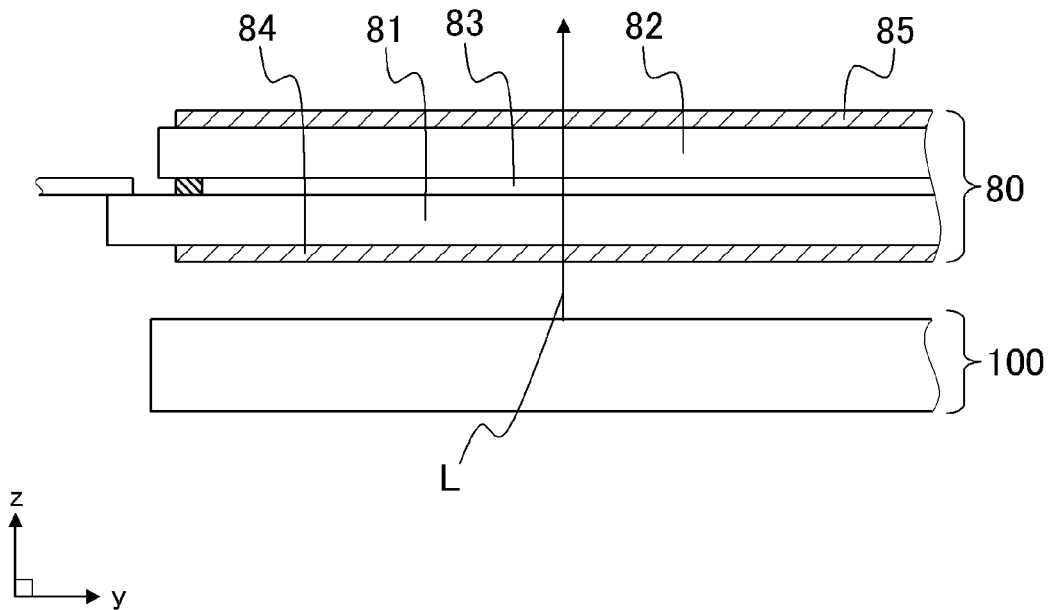
FIG. 15 is a schematic sectional view showing an example of a cross-sectional configuration of a display device according to a fourth embodiment of the present invention.
Figure 16:
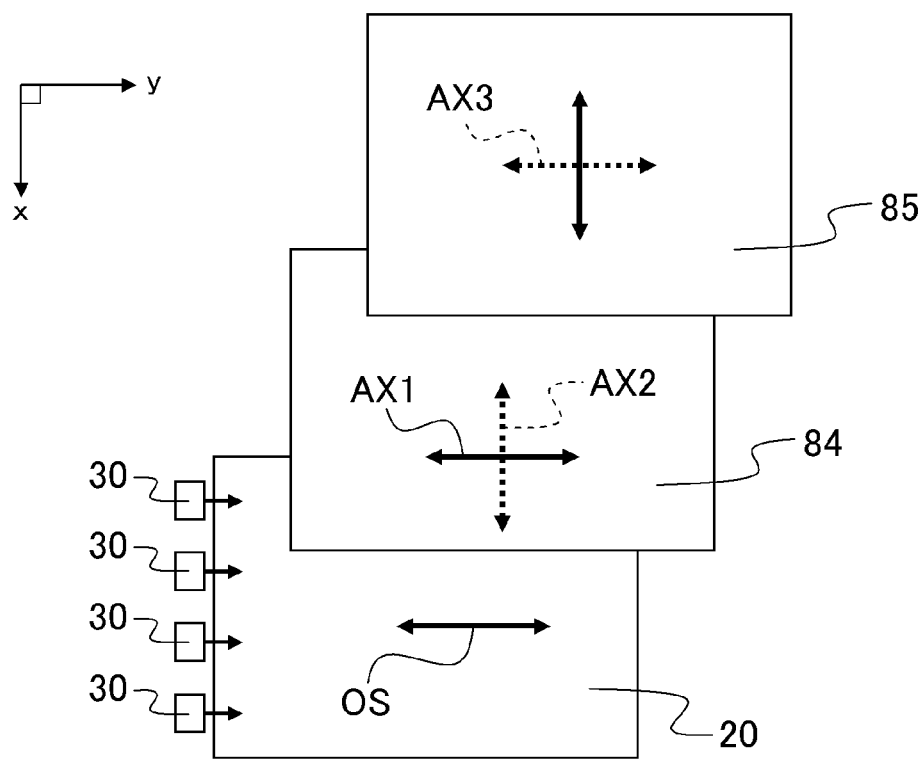
FIG. 16 is a schematic plan view showing an example of a relation between light emitted from a lighting device of the display device according to the fourth embodiment and a transmission axis of polarizers in a liquid crystal display panel.

FIGS. 15 and 16 are schematic diagrams for explaining an example of a schematic configuration of a display device according to a fourth embodiment of the present invention.

FIG. 15 is a schematic sectional view showing an example of a cross-sectional configuration of the display device according to the fourth embodiment of the present invention. FIG. 16 is a schematic plan view showing an example of a relation between light emitted from a lighting device and a transmission axis of a polarizer in a liquid crystal display panel. In FIG. 15, a cross-sectional configuration viewed on the cross section parallel to the yz plane in the xyz coordinate system shown in FIG. 1, 8, or 12, i.e., the cross section parallel to the traveling direction (the y-axis direction) of the light in the light guide 20 is shown.

In the lighting devices 100, 200, and 300 explained in the first to third embodiments, a planar beam emitted from the lighting devices is light having a large amount of p-polarized components. Such lighting devices are suitably used as, for example, a backlight of a liquid crystal display device, which is a display device in which a liquid crystal display panel is used. Therefore, in a fourth embodiment, a schematic configuration and operational effects of a liquid crystal display device including the lighting device 100 explained in the first embodiment are briefly explained.

The liquid crystal display device according to the fourth embodiment includes, for example, as shown in FIG. 15, a liquid crystal display panel 80 and the lighting device 100. The liquid crystal display panel 80 is arranged in an emitting direction of light in the lighting device 100, i.e., above the prism sheet 50 viewed from the light guide 20.

The liquid crystal display panel 80 is a display panel that controls an oriented state of a liquid crystal layer to adjust a transmitted light amount of incident light and display an image. The liquid crystal display panel 80 includes a pair of substrates 81 and 82, a liquid crystal layer 83 held between the pair of substrates 81 and 82, and a pair of polarizers 84 and 85 arranged across the substrates 81 and 82 and the liquid crystal layer 83. The liquid crystal display panel 80 in the liquid crystal display device according to the fourth embodiment may be, for example, any one of liquid crystal display panels used in the liquid crystal display device having the backlight in the past. Therefore, in the fourth embodiment, detailed explanation concerning the configuration and the operation of the liquid crystal display panel 80 is omitted.

As the lighting device, any one of the lighting devices 100, 200, and 300 explained in the first to third embodiments can be used. Light emitted from the lighting device and entering on the liquid crystal display panel 80 is light having an extremely large amount of p-polarized components as explained above. Specifically, light emitted from the lighting device 100 used in the explanation in this embodiment to the liquid crystal display panel 80 side is, for example, as shown in FIG. 16, light having a large amount of linearly polarized light components, an azimuth angle in the direction of a plane of vibration OS of which is 90 degrees, i.e., parallel to the main traveling direction (the y-axis direction) of the light in the light guide 20.

In this case, to improve utilization efficiency of the light (backlight light) emitted from the lighting device 100, the direction of a transmission axis AX1 in the polarizer 84 present in a position close to the lighting device 100 of the pair of polarizers 84 and 85 included in the liquid crystal display panel 80 only has to be set substantially parallel to the direction of the plane of vibration OS in the light emitted from the lighting device 100. The polarizer 84 only has to be adjusted such that, for example, the direction of an absorption axis AX2 is parallel to the direction of the ridgeline of the prism 51 in the prism sheet 50 included in the lighting device 100 (the longitudinal direction of the light source light incident surface on which the light source 30 is arranged in the light guide 20).

On the other hand, in the polarizer 85 present in a position far from the lighting device 100, for example, the direction of an absorption axis AX3 is set orthogonal to the direction of the ridgeline of the prism 51 of the prism sheet 50 included in the lighting device 100 (the direction of the absorption axis AX2 in the polarizer 84).

In the example shown in FIG. 16, the absorption axis AX3 in the polarizer 85 is set orthogonal to the absorption axis AX2 in the polarizer 84. However, it goes without saying that, depending on the configuration of pixels (a display mode) in the liquid crystal display panel 80, the absorption axis AX3 in the polarizer 85 is not limited to this and may be set parallel to the absorption axis AX2 in the polarizer 84.

The light emitted from the lighting device 100 is light having a large amount of linearly polarized lights (p polarized lights) having the plane of vibration OS of an electric vector in a direction (the y-axis direction in FIG. 16) orthogonal to the ridgeline direction of the prism 51 in the prism sheet 50 included in the lighting device 100 (the x-axis direction in FIG. 16). Therefore, if the absorption axis AX2 of the polarizer 84 arranged on the lighting device 100 side is set parallel to the ridgeline direction of the prism 51 in the liquid crystal display panel 80, it is possible to reduce an amount of light absorbed by the polarizer 84 and lost. In other words, in the liquid crystal display device according to the fourth embodiment, since the transmittance of the liquid crystal display panel 80 with respect to the light emitted from the lighting device 100 is increased, there is an effect that the utilization efficiency of the backlight light is improved and brighter image display can be realized. Further, in the liquid crystal display device according to the fourth embodiment, since the utilization efficiency of the backlight light is improved, for example, when image display is performed at the same brightness as the liquid crystal display device in the past, there is an effect that it is possible to reduce power consumption of the lighting device 100 (the backlight).

In the example shown in FIG. 16, the absorption axis AX2 in the polarizer 84 is parallel to an edge of the polarizer 84. However, depending on the configuration of the pixels in the liquid crystal display panel 80, the absorption axis AX2 is sometimes parallel to the edge of the polarizer 84. In that case, an angle formed with the ridgeline direction of the prism 51 (the longitudinal direction of the light source light incident surface 21 in the light guide 20) by the direction of the absorption axis AX2 of the polarizer 84 only has to be set smaller than an angle formed with a direction orthogonal to the ridgeline direction by the direction of the absorption axis AX2. When the absorption axis AX2 of the polarizer 84 is oblique to the edge in the liquid crystal display panel 80, an angle formed by the direction of the absorption axis AX2 and the edge is, for example, about 5 degrees to 15 degrees. Therefore, if the absorption axis AX2 is arranged to satisfy the condition explained above, the utilization efficiency of the backlight light is improved.

Fifth Embodiment

Figure 17:
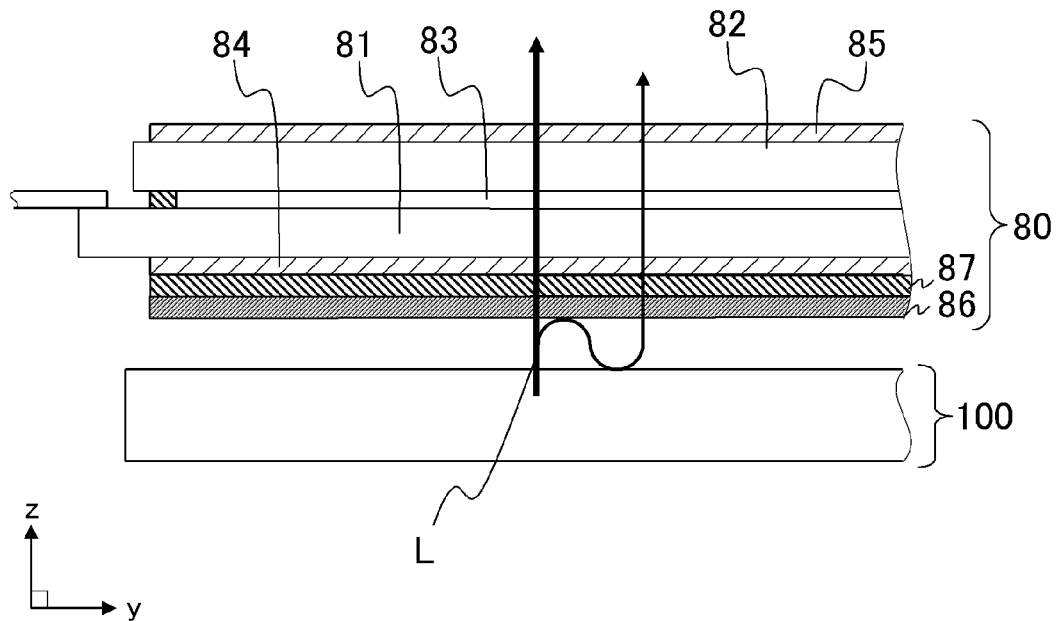
FIG. 17 is a schematic sectional view showing an example of a cross-sectional configuration of a display device according to a fifth embodiment of the present invention.
Figure 18:
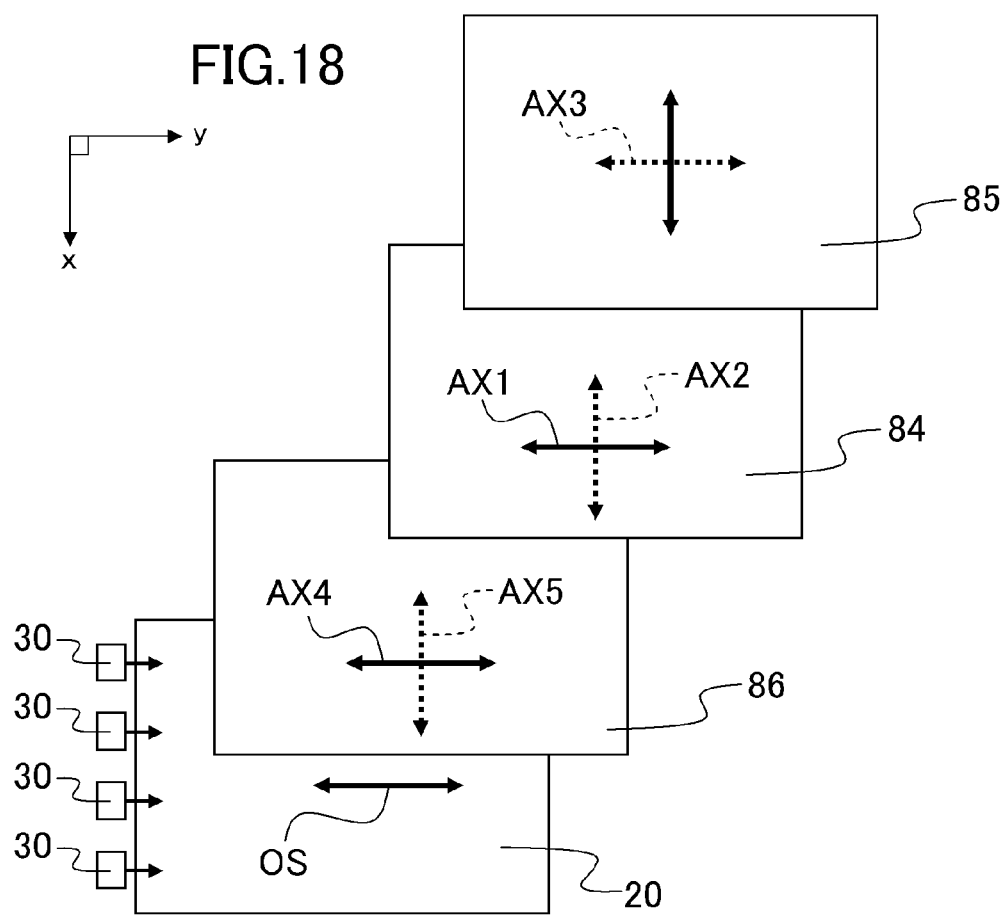
FIG. 18 is a schematic plan view showing an example of a relation between light emitted from a lighting device of the display device according to the fifth embodiment and transmission axes of polarizers and a reflective polarizer in a liquid crystal display panel.

FIGS. 17 and 18 are schematic diagrams for explaining an example of a schematic configuration of a liquid crystal display device according to a fifth embodiment of the present invention. FIG. 17 is a schematic sectional view showing an example of a cross-sectional configuration of the liquid crystal display device according to the fifth embodiment of the present invention. FIG. 18 is a schematic plan view showing an example of a relation among light emitted from a lighting device, a transmission axis of a polarizer in a liquid crystal display panel, and a transmission axis of a reflective polarizer.

In FIG. 17, a cross-sectional configuration viewed on the cross section parallel to the yz plane in the xyz coordinate system shown in FIG. 1, 8, or 12, i.e., the cross section parallel to the main traveling direction (the y-axis direction) of light in the light guide 20 is shown.

In this embodiment, in the liquid crystal display panel 80 explained in the fourth embodiment, a reflective polarizer 86 is further arranged and a diffusion pressure-sensitive adhesive layer is arranged according to necessity. Therefore, detailed explanation is omitted concerning components common to the fourth embodiment.

The liquid crystal display device according to the fifth embodiment includes the reflective polarizer 86 on the lighting device 100 side of the liquid crystal display panel 80. The liquid crystal display device includes the diffusion pressure-sensitive adhesive layer 87 between the reflective polarizer 86 and the polarizer 84, which forms the liquid crystal display panel 80, according to necessity.

As the diffusion pressure-sensitive adhesive layer 87, a diffusion pressure-sensitive adhesive layer realized by, for example, dispersing, in a transparent adhesive, particulates having a refractive index different from that of the adhesive can be used. The diffusion pressure-sensitive adhesive layer 87 is provided to expand the distribution of emission angles of light emitted from the lighting device 100 and improve in-plane uniformity of a luminance distribution. Therefore, when the liquid crystal display device includes the diffusion pressure-sensitive adhesive layer 87, in the lighting device 100, it is desirable not to use the diffusion sheet 60 having the same function.

The reflective polarizer 86 has a function of reflecting predetermined linearly polarized light components and transmitting linearly polarized light components orthogonal to the predetermined linearly polarized light components. As such a reflective polarizer 86, for example, a laminated body of cholesteric liquid crystal and a phase difference film, a film formed by laminating multiple layers of films having different kinds of refractive index anisotropy, or a wire grid polarizer can be used.

The reflective polarizer 86 is arranged in order to reduce, in light emitted from the lighting device 100, light absorbed by the polarizer 84 present in a position close to the lighting device 100 of the pair of polarizers 84 and 85, which is included in the liquid crystal display panel 80, and lost.

Therefore, as shown in FIG. 18, a transmission axis AX4 of the reflective polarizer 86 is caused to coincide with the transmission axis AX1 of the polarizer 84. In other words, a reflection axis AX5 of the reflective polarizer 86 is caused to coincide with the absorption axis AX2 of the polarizer 84.

In the display device according to this embodiment, any one of the lighting devices explained in the first to third embodiments can be used as the lighting device. Light emitted from the lighting device and entering on the liquid crystal display panel 80 is light having an extremely large amount of p-polarized light components as explained above. Specifically, light emitted from the lighting device 100 used in the explanation in this embodiment to the liquid crystal display panel 80 side is, for example, as shown in FIG. 18, light having a large amount of linearly polarized light components, an azimuth angle in the direction of the plane of vibration OS of which is 90 degrees, i.e., parallel to the main traveling direction (the y-axis direction) of the light in the light guide 20.

In this case, to improve utilization efficiency of the light (backlight light) emitted from the lighting device 100, both the directions of the transmission axis AX1 in the polarizer 84 present in the position close to the lighting device 100 of the pair of polarizers 84 and 85 included in the liquid crystal display panel 80 and the transmission axis AX4 of the reflective polarizer 86 only have to be set substantially parallel to the direction of the plane of vibration OS in the light emitted from the lighting device 100.

In the example shown in FIG. 18, the absorption axis AX3 in the polarizer 85 is set orthogonal to the absorption axis AX2 in the polarizer 84. However, it goes without saying that, depending on the configuration of pixels (a display mode) in the liquid crystal display panel 80, the absorption axis AX3 in the polarizer 85 is not limited to this and may be set parallel to the absorption axis AX2 in the polarizer 84.

The light emitted from the lighting device 100 is light having a large amount of linearly polarized lights (p polarized lights) having the plane of vibration OS of an electric vector in a direction (the y-axis direction in FIG. 18) orthogonal to the ridgeline direction of the prism 51 in the prism sheet 50 included in the lighting device 100 (the x-axis direction in FIG. 18). Therefore, if the absorption axis AX2 of the polarizer 84 arranged on the lighting device 100 side and the reflection axis AX5 of the reflective polarizer 86 are set parallel to the ridgeline direction of the prism 51 in the liquid crystal display panel 80, it is possible to reduce an amount of light absorbed by the polarizer 84 and lost.

In the light emitted from the lighting device 100, a polarized light component to be absorbed by the polarizer 84 is reflected on the reflective polarizer 86 before being absorbed by the polarizer 84 and returns to the lighting device 100.

The light returned to the lighting device 100 is reflected on the lighting device 100 and travels in the direction of the liquid crystal display panel 80 again. A polarization state of the light reflected on the lighting device 100 is changed. A part of the light is transmitted through the reflective polarizer 86 and the polarizer 84 and effectively used as display light.

In particular, in the lighting device explained in the first and third embodiments, it is possible to increase the reflectance in the front direction of the lighting device by contriving the cross-sectional shape of the prism forming the prism sheet 50 or the prism sheet 350. In this case, the light reflected on the reflective polarizer 86 and returning to the lighting device side can be reflected to the front direction or the direction near the front direction at high efficiency and reused. Therefore, an effect is obtained that it is possible to realize a liquid crystal display device having higher luminance in the front direction or the direction near the front direction.

To increase the reflectance in the front direction of the light traveling from the liquid crystal display panel 80 side to the lighting device side, it is desirable not to provide, between the liquid crystal display panel 80 and the prism sheet 50 arranged on the top surface of the lighting device, a member that diffuses the light. In other words, it is desirable to provide no light-diffusing member between the reflective polarizer 86 provided on the rear surface of the liquid crystal display panel 80 and the prism sheet 50 of the lighting device.

In this embodiment, a light-diffusing member for improving uniformity of the luminance of the light emitted from the lighting device 100 is realized by the diffusion pressure-sensitive adhesive layer 87 provided between the polarizer 84 and the reflective polarizer 86. Therefore, when the light reflected on the reflective polarizer 86 returns to the lighting device 100, the reflectance in the front direction can be increased.

Specifically, in the liquid crystal display device according to the fifth embodiment, the transmittance of the liquid crystal display panel 80 with respect to the light emitted from the lighting device 100 is increased and the operational effect of the reflective polarizer 86 is improved. Therefore, there is an effect that the utilization efficiency of the backlight light is improved and brighter image display can be realized.

In other words, in the liquid crystal display device according to the fifth embodiment, since the utilization efficiency of the backlight light is improved, for example, when image display is performed at the same brightness as the liquid crystal display device in the past, there is an effect that it is possible to reduce power consumption of the lighting device 100 (the backlight).

In the example shown in FIG. 18, the absorption axis AX2 in the polarizer 84 is parallel to an edge of the polarizer 84. However, depending on the configuration of the pixels in the liquid crystal display panel 80, the absorption axis AX2 is sometimes oblique to the edge of the polarizer 84. In that case, an angle formed with the ridgeline direction of the prism 51 (the longitudinal direction of the light source light incident surface 21 in the light guide 20) by the direction of the absorption axis AX2 of the polarizer 84 only has to be set smaller than an angle formed with a direction orthogonal to the ridgeline direction by the direction of the absorption axis AX2. When the absorption axis AX2 of the polarizer 84 is oblique to the edge in the liquid crystal display panel 80, an angle formed by the direction of the absorption axis AX2 and the edge is, for example, about 5 degrees to 15 degrees. Therefore, if the absorption axis AX2 is arranged to satisfy the condition explained above, the utilization efficiency of the backlight light is improved.

The present invention is specifically explained above on the basis of the embodiments. However, it goes without saying that the present invention is not limited to the embodiments and various modifications of the embodiments are possible without departing from the spirit of the present invention.

In the first to third embodiment, as the configuration example of the light guide 20, the configuration in which the light extraction structure 23 is provided on the planar substrate having the substantially uniform thickness in the main traveling direction of the guided light is explained. However, it goes without saying that the configuration of the light guide 20 is not limited to this and may be a wedge shape, the thickness in the main traveling direction of the guided light of which decreases further away from the light source 30 or may be a configuration in which a structure different from the light extraction structure, for example, a V-shaped or semicircular structure having a ridgeline in a direction parallel to the main traveling direction of the guided light is provided on the front surface, which is the planar light emission surface of the light guide, or the rear surface.

In the embodiments, the display device in which the lighting device according to the present invention is used is the liquid crystal display device. However, the display device may be other display devices that require the lighting device such as an MEMS (Micro Electro Mechanical Systems) shutter display device.

While there have been described what are at present considered to be certain embodiments of the invention, it will be understood that various modifications may be made thereto, and it is intended that the appended claim cover all such modifications as fall within the true spirit and scope of the invention.

What is claimed is:
1. A lighting device comprising:
a light source;
a light guide provided adjacent to the light source and including a light source light incident surface on which light emitted by the light source enters and a planar light emission surface from which planar light is emitted; and an optical sheet arranged to be opposed to the planar light emission surface of the light guide, including a planar light incident surface on which the planar light enters, and configured to change a traveling direction of the planar light emitted from the light guide because a light emission side of the optical sheet where the light entering from the planar light incident surface is emitted has a shape in which plural columnar prisms extending in parallel to the light source light incident surface are arranged side by side; wherein each of the plural columnar prisms has a plurality of distal surfaces, which are surfaces on a side relatively far from the light source when viewed from a ridgeline of the columnar prism, and a plurality of proximal surfaces, which are surfaces on a side relatively close to the light source when viewed from the ridgeline of the columnar prism;

the plurality of distal surfaces and the plurality of proximal surfaces are inclined surfaces for forming an outer shape of the columnar prism;

the plurality of distal surfaces incline such that a thickness of the optical sheet is decreased as the distal surfaces are farther away from the ridgeline;

the plurality of proximal surfaces incline such that the thickness of the optical sheet is increased as the proximal surfaces are near the ridgeline;

at least two of the plurality of distal surfaces have different inclination angles, the inclination angle of a respective distal surface being represented in a range of 0° to 90° and formed with the planar light incident surface by the respective distal surface; and each of the plurality of proximal surfaces is inclined at a larger inclination angle than an inclination angle of each of the plurality of distal surfaces, the inclination angle of a respective proximal surface being represented in a range of 0° to 90° and formed with the planar light incident surface by the respective proximal surface.

2. The lighting device according to claim 1, wherein, in the columnar prism, the inclination angle represented in the range of 0° to 90° formed with the planar light incident surface by the proximal surfaces is larger than 0° and equal to or smaller than 10° with respect to the inclination angle represented in the range of 0° to 90° formed with the planar light incident surface by one of the distal surfaces having a highest ratio of an occupied area when projected on the planar light incident surface among the plurality of distal surfaces.

3. The lighting device according to claim 1, wherein a difference $\Delta\phi$ between two different inclination angles of the plurality of distal surfaces is $4° \leq \Delta\phi \leq 20°$.

4. The lighting device according to claim 3, wherein the difference $\Delta\phi$ between two different inclination angles of the plurality of distal surfaces is $5° \leq \Delta\phi \leq 15°$.

5. The lighting device according to claim 1, wherein, when the plurality of distal surfaces of the columnar prism are projected on the planar light incident surface, a ratio of an area occupied by any one of the projected distal surfaces is 10 to 30%.

6. The lighting device according to claim 1, wherein, when the plurality of distal surfaces of the columnar prism are projected on the planar light incident surface, a ratio of an area occupied by any one of the projected distal surfaces is 20 to 25%.

7. A display device comprising:
the lighting device according to claim 1; and
a display panel arranged in a traveling direction of light emitted from the lighting device.

8. A liquid crystal display device comprising:
the lighting device according to claim 1; and
a liquid crystal display panel arranged in a traveling direction of light emitted from the lighting device, wherein
the liquid crystal display panel includes a pair of polarizers arranged across a liquid crystal layer, and
an angle formed with the ridgeline direction by a direction of an absorption axis of a polarizer arranged in a position close to the lighting device of the pair of polarizers is smaller than an angle formed with a direction orthogonal to the ridgeline direction by the direction of the absorption axis.

9. The liquid crystal display device according to claim 8, wherein
the liquid crystal display panel further includes a reflective polarizer on the lighting device side, and
a reflection axis of the reflective polarizer is substantially parallel to the absorption axis of the polarizer arranged in the position close to the lighting device.

10. The liquid crystal display device according to claim 9, wherein
the liquid crystal display panel further includes a diffusion adhesive between the polarizer arranged in the position close to the lighting device and the reflective polarizer.

11. The liquid crystal display device according to claim 1, wherein
the proximal surfaces and the distal surfaces of the columnar prism are alternately disposed.

12. A lighting device comprising:
a light source;
a light guide provided adjacent to the light source and including a light source light incident surface on which light emitted by the light source enters and a planar light emission surface from which planar light is emitted; and
an optical sheet arranged to be opposed to the planar light emission surface of the light guide, including a planar light incident surface on which the planar light enters, and configured to change a traveling direction of the planar light emitted from the light guide because a light emission side of the optical sheet where the light entering from the planar light incident surface is emitted has a shape in which plural columnar prisms extending in parallel to the light source light incident surface are arranged side by side;
wherein
each of the plural columnar prisms has a plurality of distal surfaces, which are surfaces on a side relatively far from the light source when viewed from a ridgeline of the columnar prism, and a plurality of proximal surfaces, which are surfaces on a side relatively close to the light source when viewed from the ridgeline of the columnar prism;
the plurality of distal surfaces and the plurality of proximal surfaces are inclined surfaces for forming an outer shape of the columnar prism;
the plurality of distal surfaces incline such that a thickness of the optical sheet is decreased as the distal surfaces are farther away from the ridgeline;
the plurality of proximal surfaces incline such that the thickness of the optical sheet is increased as the proximal surfaces are near the ridgeline;
at least two of the plurality of distal surfaces have different inclination angles, the inclination angle of a respective distal surface being represented in a range of 0° to 90° and formed with the planar light incident surface by the respective distal surface; and the plurality of proximal surfaces and the plurality of distal surfaces of the columnar prism are alternately disposed, and an inclination angle of the distal surface of the plurality of distal surfaces having a highest area ratio among the plurality of distal surfaces is equal to an inclination angle of all of the plurality of proximal surfaces, the inclination angle of a respective proximal surface being represented in a range of 0° to 90° and formed with the planar light incident surface by the respective proximal surface.

13. A liquid crystal display device comprising:

the lighting device according to claim 12; and a liquid crystal display panel arranged in a traveling direction of light emitted from the lighting device;

wherein the liquid crystal display panel includes a pair of polarizers arranged across a liquid crystal layer and a reflective polarizer on the lighting device side; and an angle formed with the ridgeline direction by a direction of an absorption axis of a polarizer arranged in a position close to the lighting device of the pair of polarizers is smaller than an angle formed with a direction orthogonal to the ridgeline direction by the direction of the absorption axis; and a reflection axis of the reflective polarizer is substantially parallel to the absorption axis of the polarizer arranged in the position close to the lighting device.

14. The lighting device according to claim 12, wherein the columnar prism has three distal surfaces having three different inclination angles, and differences $\Delta\phi 13$ and $\phi 35$ between inclination angles of two distal surfaces having close inclination angles among the three distal surfaces are $4°\leq\Delta\phi 13\leq 20°$ and $4°\leq\Delta\phi 35\leq 20°$.

15. The lighting device according to claim 12, wherein the columnar prism has three distal surfaces having three different inclination angles, and differences $\phi 13$ and $\phi 35$ between inclination angles of two distal surfaces having close inclination angles among the three distal surfaces are $5°\leq\Delta\phi 13\leq 15°$ and $5°\leq\Delta\phi 35\leq 15°$.

* * * * *